United States Patent
Boek et al.

(10) Patent No.: US 12,179,459 B2
(45) Date of Patent: Dec. 31, 2024

(54) GLASS ARTICLES WITH RESIDUAL STRESS AND VISCOSITY PROPERTIES FOR SAGGING PROCESSES, AND COMPOSITIONS FOR THE SAME

(71) Applicant: CORNING INCORPORATED, Corning, NY (US)

(72) Inventors: Heather Debra Boek, Corning, NY (US); Venkatesh Botu, Corning, NY (US); Timothy Michael Gross, Corning, NY (US); Balamurugan Meenakshi Sundaram, Painted Post, NY (US); Adama Tandia, Corning, NY (US); Lisa Anne Tietz Moore, Corning, NY (US); Kochuparambil Deenamma Vargheese, Horseheads, NY (US); Mark Owen Weller, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 257 days.

(21) Appl. No.: 17/292,157

(22) PCT Filed: Nov. 1, 2019

(86) PCT No.: PCT/US2019/059390
§ 371 (c)(1),
(2) Date: May 7, 2021

(87) PCT Pub. No.: WO2020/096897
PCT Pub. Date: May 14, 2020

(65) Prior Publication Data
US 2021/0387442 A1    Dec. 16, 2021

Related U.S. Application Data

(60) Provisional application No. 62/757,856, filed on Nov. 9, 2018.

(51) Int. Cl.
*B32B 17/06*  (2006.01)
*B32B 7/022*  (2019.01)
(Continued)

(52) U.S. Cl.
CPC .............. *B32B 17/06* (2013.01); *B32B 7/022* (2019.01); *C03C 3/087* (2013.01); *C03C 3/091* (2013.01);
(Continued)

(58) Field of Classification Search
CPC ..... B32B 17/06; B32B 7/022; B32B 2315/08; B32B 2419/00; B32B 2605/08;
(Continued)

(56) References Cited

U.S. PATENT DOCUMENTS 9,375,900 B2   6/2016  Tsuchiya et al.
2014/0141217 A1*  5/2014  Gulati ................... C03B 23/20
                                                    428/375

(Continued)

FOREIGN PATENT DOCUMENTS

CN    105392627 A    3/2016
CN    106660327 A    5/2017

(Continued)

OTHER PUBLICATIONS

Journa l of Research of the National Bureau of Sta ndards Vo!' 59, No. 3, Sep. 1957 Research Paper 2791 Determination and Use of the Sag Point as a Reference Point in the Heating of Glasses Sam Spinner, Given W. Cleek, and Edgar H. Hamilton (Year: 1957).*

(Continued)

*Primary Examiner* — Alicia J Weydemeyer
*Assistant Examiner* — Laura B Figg
(74) *Attorney, Agent, or Firm* — Daniel J. Greenhalgh

(57) ABSTRACT

A laminate glass article is provided that includes: a core glass layer comprising a first coefficient of thermal expan-
(Continued)

sion (CTE); and a plurality of clad glass layers, each comprising a first primary surface, a second primary surface in contact with the core glass layer and a second CTE that is lower than the first CTE of the core glass layer. The difference in the first and second CTE is about $10 \times 10^{-7}$/#C to about $70 \times 10^{-7}$/#C. Further, each of the core glass layer and the clad glass layers comprises a viscosity from $10^{9.0}$ to $10^{14.0}$ Poise from about 550 #C to about 700 #C.

25 Claims, 7 Drawing Sheets

(51) Int. Cl.
    *C03C 3/087*     (2006.01)
    *C03C 3/091*     (2006.01)
    *C03C 3/093*     (2006.01)
    *C03C 3/097*     (2006.01)
    *C03C 4/18*     (2006.01)
    *C03C 21/00*     (2006.01)

(52) U.S. Cl.
    CPC .............. *C03C 3/093* (2013.01); *C03C 3/097* (2013.01); *C03C 4/18* (2013.01); *C03C 21/002* (2013.01); *B32B 2315/08* (2013.01); *B32B 2419/00* (2013.01); *B32B 2605/08* (2013.01); *C03C 2204/00* (2013.01)

(58) Field of Classification Search
    CPC ......... C03C 3/087; C03C 3/091; C03C 3/093; C03C 3/097; C03C 4/18; C03C 21/002; C03C 2204/00
    See application file for complete search history.

(56) References Cited

U.S. PATENT DOCUMENTS

| | | |
|---|---|---|
| 2015/0375475 A1 | 12/2015 | Cook |
| 2017/0121209 A1 | 5/2017 | Dannoux et al. |
| 2017/0361574 A1* | 12/2017 | Kiczenski ............... B32B 17/06 |
| 2018/0237326 A1* | 8/2018 | Fredholm ............. C03B 23/025 |
| 2018/0326704 A1 | 11/2018 | Harris et al. |

FOREIGN PATENT DOCUMENTS

| | | |
|---|---|---|
| CN | 107207310 A | 9/2017 |
| CN | 108349218 A | 7/2018 |
| EP | 3116834 A1 | 1/2017 |
| WO | 2015/138660 A1 | 9/2015 |
| WO | 2018/102172 A1 | 6/2018 |
| WO | 2018/102173 A1 | 6/2018 |
| WO | 2018/237266 A1 | 12/2018 |
| WO | 2019/161261 A1 | 8/2019 |
| WO | 2019/200203 A1 | 10/2019 |
| WO | 2020/046730 A1 | 3/2020 |

OTHER PUBLICATIONS

International Search Report and Written Opinion of the International Searching Authority; PCT/US2019/059390; dated Feb. 5, 2020; 8 pages; European Patent Office.
Chinese Patent Application No. 201980085905.4, Office Action, dated Oct. 26, 2022, 32 pages (18 pages of English Translation and 14 pages of Original Copy); Chinese Patent Office.

* cited by examiner

GLASS ARTICLES WITH RESIDUAL STRESS AND VISCOSITY PROPERTIES FOR SAGGING PROCESSES, AND COMPOSITIONS FOR THE SAME

CROSS-REFERENCE TO RELATED APPLICATIONS

This application is a national stage application under 35 U.S.C. § 371 of International Application No. PCT/US2019/059390, filed on Nov. 1, 2019, which claims the benefit of priority under 35 U.S.C. § 119 of U.S. Provisional Application Ser. No. 62/757,856 filed on Nov. 9, 2018 the content of each of which is relied upon and incorporated herein by reference in its entirety.

FIELD OF THE DISCLOSURE

The disclosure relates to glass articles, and more particularly to laminate glass articles with residual compressive stress and viscosity characteristics suitable for various curved glass applications, including for automotive and architectural glazing. The disclosure also relates to methods of making, and glass compositions, for these articles.

BACKGROUND

Glass is commonly used in windows for various applications due to its clarity and durability. Automotive and architectural windows and glazing may include a single glass article in a sheet or monolithic form, or a laminate that includes two or more glass articles in sheet form. Many conventional automobile windshields, for example, comprise laminates of two sheets of soda-lime glass (SLG) with a polymer layer (e.g., polyvinyl butyral) between them. More generally, these laminate and monolithic glazing forms can be employed in various windshield, sidelite, rear window, passenger window, sunroofs and automotive window structures. Architectural applications can utilize similar glazing structures in buildings, panels, walls, and the like.

Many of these automotive and architectural applications employ monolithic and laminate glass articles in curved glazing structures that can be manufactured with sagging processes. In a sagging process, the glass layer(s) of the monolith or laminate structure are heated to a temperature at which the glass layer(s) sag to the desired shape for the particular application. As such, the composition of the glass layer(s) can significantly influence the viscosity and, therefore, the sagging-related processing of these glass layer(s) into the desired monolithic or laminate glass article form for the intended automotive or architectural application.

Automotive manufacturers continue to focus on weight saving to improve fuel economy and reduce emissions, which includes reducing the weight of window structures. Building designers and developers also wish to reduce the weight of window structures to reduce raw material costs and mechanical load requirements. Some attempts to achieve such weight saving have involved the use of thinner glass articles in monolith window structures. Similarly, thinner inner glass layers have been envisioned for use in laminate window structures to provide weight savings. Unfortunately, these efforts have often failed as compositional changes and/or strengthening processes to increase the strength levels of these thinned layers to account for the thickness reductions have generally come at the expense of decreased viscosity control for sagging-related processing. For example, conventional strengthened aluminosilicate glasses employed in an attempt to obtain a thickness reduction have not been amenable to a co-sagging process with a conventional SLG layer (e.g., for an automobile windshield) given the significantly higher viscosity levels of these aluminosilicate glasses relative to the SLG glass.

Accordingly, there is a need for glass articles, and more particularly for laminate glass articles with residual compressive stress and viscosity characteristics suitable for various curved glass applications, including for automotive and architectural glazing. Likewise, there is a need for methods of making these articles, along with glass compositions for them.

SUMMARY OF THE DISCLOSURE

According to some aspects of the present disclosure, a laminate glass article is provided that includes: a core glass layer comprising a first coefficient of thermal expansion (CTE); and a plurality of clad glass layers, each comprising a first primary surface, a second primary surface in contact with the core glass layer and a second CTE that is lower than the first CTE of the core glass layer. The difference in the first and second CTE is about $10 \times 10^{-7}/°$ C. to about $70 \times 10^{-7}/°$ C. Further, each of the core glass layer and the clad glass layers comprises a viscosity from $10^{9.0}$ to $10^{14.0}$ Poise from about 550° C. to about 700° C.

According to other aspects of the present disclosure, a laminate glass-ceramic article is provided that includes: a core glass layer comprising a first coefficient of thermal expansion (CTE); and a plurality of clad glass layers, each comprising a first primary surface, a second primary surface in contact with the core glass layer and a second CTE that is lower than the first CTE of the core glass layer. The difference in the first and second CTE is about $10 \times 10^{-7}/°$ C. to about $70 \times 10^{-7}/°$ C. Further, each of the core glass layer and the clad glass layers comprises a viscosity from $10^{9.0}$ to $10^{14.0}$ Poise from about 550° C. to about 700° C. In addition, a total thickness of the plurality of clad glass layers and the core glass layer ranges from about 0.15 mm to about 3 mm.

According to further aspects of the disclosure, a laminate glass-ceramic article is provided that includes: a core glass layer comprising a first coefficient of thermal expansion (CTE); and a plurality of clad glass layers, each comprising a first primary surface, a second primary surface in contact with the core glass layer and a second CTE that is lower than the first CTE of the core glass layer. The difference in the first and second CTE is about $10 \times 10^{-7}/°$ C. to about $70 \times 10^{-7}/°$ C. Further, each of the core glass layer and the clad glass layers comprises a viscosity from $10^{9.0}$ to $10^{14.0}$ Poise from about 550° C. to about 700° C. In addition, a ratio of the thickness of the core glass layer to the thickness of the plurality of clad glass layers is about 1 to about 20.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the disclosure and the appended claims.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following embodiments.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
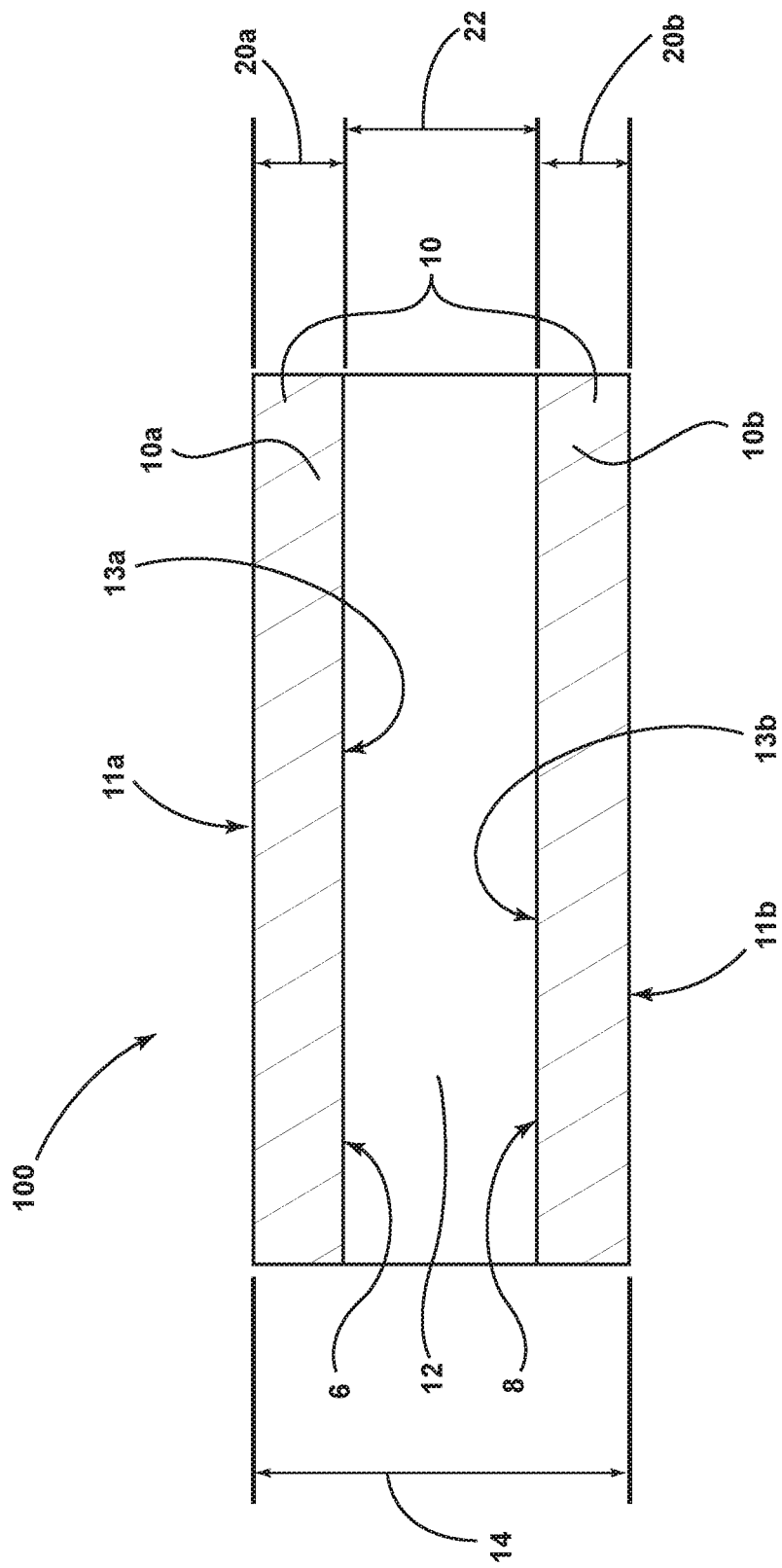
FIG. 1 is a cross-sectional schematic view of a laminate glass article comprising glass core and clad layers, according to at least one example of the disclosure.

Additional features and advantages will be set forth in the detailed description which follows and will be apparent to those skilled in the art from the description, or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As also used herein, the terms "glass article" and "glass articles" are used in their broadest sense to include any object made wholly or partly of glass and/or glass-ceramics. Unless otherwise specified, all compositions are expressed in terms of weight percent (wt. %). Coefficients of thermal expansion (CTE) are expressed in terms of $10^{-7}/°$ C. and represent a value measured over a temperature range from about 20° C. to about 300° C., unless otherwise specified.

The terms "relatively low CTE" and "low CTE" are used interchangeably in the disclosure with regard to clad glass layers with a starting glass composition (e.g., prior to drawing, laminating, and ion exchange) having a CTE that is lower than the CTE of the starting composition of the core glass by at least about $5\times10^{-7}/°$ C. Conversely, the terms "relatively high CTE" and "high CTE" are used interchangeably in the disclosure with regard to core glass layers with a starting glass composition having a CTE that is higher than the CTE of the starting composition of the clad glass by at least about $5\times10^{-7}/°$ C. The CTE of clad glass layers may also be lower than the CTE of the core glass layer by an amount in the range from about $5\times10^{-7}/°$ C. to about $70\times10^{-7}/°$ C., from about $10\times10^{-7}/°$ C. to about $70\times10^{-7}/°$ C., from about $10\times10^{-7}/°$ C. to about $60\times10^{-7}/°$ C., or from about $10\times10^{-7}/°$ C. to about $50\times10^{-7}/°$ C. For example, the core glass may have a CTE of about $100\times10^{-7}/°$ C. and the clad glass layers may have a CTE of about $50 \times 10^{-7}/° C.$, such that there is a difference of about $50 \times 10^{-7}/° C.$ between the CTE of the core glass and the clad glass layers.

The terms "mechanically strengthened laminate glass article" and "mechanical strengthening" are used in relation to the laminate glass articles of the disclosure to mean a laminate glass article that has been formed by laminating a high CTE core glass to low CTE clad glass layers, thereby creating compressive stresses in the clad glass layers when the laminate is cooled following lamination. These compressive stresses can offset externally applied mechanical stresses, which have the net effect of strengthening the laminate.

The terms "chemically strengthened", "chemical strengthening" and "ion exchange strengthening", as used in the present description, are intended to mean glass (e.g., a core glass layer, a clad glass layer, etc.) that has been strengthened using an ion exchange process, as understood by those with ordinary skill in the field of the disclosure, to create ion-exchanged compressive stresses in the surface region of the glass at one or more of its outer primary surfaces and edges.

As noted earlier, the laminate and monolithic glass articles of the disclosure can be manufactured with sagging processes. As used herein, in a "sagging process", the glass layer(s) of the monolith or laminate structure are heated to a temperature at which the glass layer(s) sag to the desired shape for the particular application. Further, the temperature at which the glass layer(s) are heated to during a sagging process is referred to as the "sag temperature". As used herein, the "sag temperature" means the temperature at which the log viscosity of the glass article is $10^{9.9}$ Poise. The sag temperature is determined by fitting the Vogel-Fulcher-Tamman (VFT) equation: Log $h = A + B/(T-C)$, where T is the temperature, A, B and C are fitting constants and h is the dynamic viscosity, to annealing point data measured using the bending beam viscosity (BBV) measurement, to softening point data measured by fiber elongation or parallel plate viscosity (PPV). As a reference point for the laminate and monolithic glass articles of the disclosure, conventional soda lime glass (SLG) can exhibit a sag temperature between about 550° C. and 720° C. Further, when monolithic, laminate or combinations of monolithic and laminate glass articles of the disclosure are sagged together when stacked on top of one another, the process is referred to as "pair sagging" or "co-sagging".

In general, the disclosure is directed to glass articles, including laminate glass articles with residual compressive stress (i.e., through CTE mismatch between the core and clad glass layers) and viscosity characteristics suitable for various curved glass applications, including for automotive and architectural glazing. The disclosure also includes methods of making these articles, along with glass compositions for them. The glass compositions of the disclosure are suitable for co-sagging processes with an SLG ply, e.g., to form automotive and architectural glazing. Viscosity within the co-sagging temperature range can be controlled by selecting particular compositions of the core glass and/or clad glass layers. Various viscosity adjustments can be made within the compositional ranges of the disclosure, particularly given that the glass compositions employed for the laminate articles of the disclosure are not required to be ion-exchangeable glass compositions (e.g., given the compressive residual stresses afforded by the CTE mismatch between the core and clad glass layers). It is also possible to control the viscosity of the laminate glass articles by controlling the thickness ratios of the core and clad glass layers. Still further, embodiments of the core and clad glass compositions are ion-exchangeable, thus facilitating the development of compressive stress regions obtained through the summation of mechanical and ion exchange processes.

Referring now to FIG. 1, an exemplary, laminate glass article 100 is provided according to an embodiment of the disclosure. As noted earlier, these laminate glass articles can be employed in various window and window-related applications, e.g., automotive windshields, automotive sunroofs, architectural glazing, and others. The laminate glass article 100 depicted in FIG. 1 includes a core glass layer 12 having a thickness 22 and a first coefficient of thermal expansion (CTE); and a plurality of clad glass layers 10, each having a CTE that is lower than or equal to the first CTE of the core glass layer 12. A first of the clad glass layers 10a, having a thickness 20a, is laminated to a first surface 6 of the core glass layer 12. Further, clad glass layer 10a has a first primary surface 11a and a second primary surface 13a, the second primary surface 13a being in contact with the first surface 6 of the core glass layer 12. A second of the clad layers 10b, having a thickness 20b, is laminated to a second surface 8 of the core glass layer 12. Clad layer 10b has a first primary surface 11b and a second primary surface 13b, the second primary surface 13b being in contact with the second surface 8 of the core glass layer 12.

Referring again to the laminate glass article 100 depicted in FIG. 1, the total thickness 14 of the core glass layer 12 and the plurality of clad glass layers 10 ranges from about 0.15 mm to about 5 mm. In some embodiments of the laminate glass article 100 depicted in FIG. 1, the total thickness 14 is from about 0.15 mm to about 4 mm, or from about 0.15 mm to about 3 mm. In embodiments of the laminate glass article 100 depicted in FIG. 1, the clad glass layers 10a, 10b and the core glass layer 12 may have a selected length and width, or diameter, to define their surface area. For example, the core glass layer 12 may have at least one edge between the primary surfaces 6, 8, as defined by its length and width, or diameter. In some implementations, the total thickness 14 of the laminate glass article 100 does not exceed about 3 mm, or about 2.5 mm. Further, in some aspects, the total thickness 14 ranges from about 0.15 mm to about 3.0 mm, from about 0.2 mm to about 3 mm, from about 0.3 mm to about 3 mm, from about 0.15 mm to about 1 mm, from about 0.15 mm to about 2 mm, from about 0.15 mm to about 2.5 mm, from about 0.2 mm to about 1 mm, from about 0.2 mm to about 2 mm, from about 0.2 mm to about 2.5 mm, and all thickness values between these thickness values.

Referring again to the laminate glass article 100 depicted in FIG. 1, the thickness 22 of the core glass layer 12 can range from about 0.1 mm to about 5 mm, from about 0.1 mm to about 4 mm, from about 0.1 mm to about 3 mm, from about 0.1 mm to about 2.5 mm, from about 0.1 mm to about 2 mm, from about 0.1 mm to about 1 mm, from about 0.2 mm to about 5 mm, from about 0.2 mm to about 4 mm, from about 0.2 mm to about 3 mm, from about 0.2 mm to about 2.9 mm, from about 0.2 mm to about 2.8 mm, from about 0.2 mm to about 2.7 mm, from about 0.2 mm to about 2.6 mm, from about 0.2 mm to about 2.5 mm, from about 0.2 mm to about 2 mm, from about 0.3 mm to about 5 mm, from about 0.3 mm to about 2.5 mm, from about 0.3 mm to about 2 mm, and all thickness values between these thickness levels.

Still referring to the laminate glass article 100 depicted in FIG. 1, the thicknesses 20a, 20b of the clad glass layers 10a, 10b can each range from about 0.01 mm to about 5 mm, from about 0.01 mm to about 4 mm, from about 0.01 mm to about 3 mm, from about 0.01 mm to about 2.5 mm, from about 0.01 mm to about 2 mm, from about 0.05 mm to about 3 mm, from about 0.05 mm to about 2.5 mm, from about 0.05 mm to about 2.0 mm, from about 0.05 mm to about 1.5 mm, from about 0.05 mm to about 1 mm, from about 0.05 mm to about 0.5 mm, from about 0.05 mm to about 0.4 mm, from about 0.05 mm to about 0.3 mm, from about 0.05 mm to about 0.2 mm, from about 0.05 mm to about 0.1 mm, from about 0.1 mm to about 3 mm, from about 0.1 mm to about 2.5 mm, from about 0.1 mm to about 2 mm, from about 0.2 mm to about 3 mm, from about 0.2 mm to about 2.5 mm, from about 0.2 mm to about 2 mm, from about 0.3 mm to about 3 mm, from about 0.3 mm to about 2.5 mm, from about 0.3 mm to about 2 mm, and all thickness values between these thickness levels.

Again referring to the laminate glass article 100 depicted in FIG. 1, according to some embodiments, a ratio of the thickness 22 of the core glass layer 12 to the sum of the thicknesses 20a and 20b of the clad layers 10a and 10b can range from about 0.5 to about 30, from about 0.5 to about 20, from about 1 to about 20, from about 1 to about 10, or from about 1 to about 7. In some implementations of the laminate glass article 100 depicted in FIG. 1, the ratio of the thickness 22 of the core glass layer 12 to the sum of the thicknesses 20a and 20b of the clad glass layers 10a and 10b can be about 0.5, 0.75, 1, 2, 3, 4, 5, 6, 7, 8, 9, 10, 15, 20, 25, 30, and all ratios between these core-to-clad ratio levels.

According to some aspects of the disclosure, the laminate glass article 100 depicted in FIG. 1 can include a relatively high CTE core glass layer 12 and relatively low CTE clad glass-ceramic layers 10a, 10b laminated to each of the primary surfaces 6, 8 of the core glass layer 12. The plurality of relatively low CTE clad glass layers 10 can be laminated to the relatively high CTE core glass layer 12 by bonding the surfaces of the layers together at elevated temperatures such that the plurality of clad glass layers 10a, 10b are fused to the core glass layer 12. The laminate glass article 100 is then allowed to cool. As the laminate glass article 100 cools, the relatively high CTE core glass layer 12 contracts more than the plurality of relatively low CTE clad glass layers 10a, 10b that are securely bonded to the surfaces of the core glass layer 12. Due to the variable contraction of the core glass layer 12 and the clad glass layers 10a, 10b during cooling, the core glass layer 12 is placed in a state of tension (or tensile stress) and the clad glass layers 10a, 10b are placed in a state of compression (or compressive stress). This results in a mechanically strengthened, laminate glass article 100 having a stress profile in which the compressive stress extends entirely through the plurality of clad glass layers 10a, 10b (e.g., through each of the clad glass layers 10a, 10b). An advantageous compressive stress region is thus formed in the laminate glass article 100. Compressive stresses ("CS") at the surface of the clad glass layers 10 can range from about 20 MPa to about 700 MPa, for example, from about 20 MPa to about 400 MPa, or from about 50 MPa to about 700 MPa, and other values between these ranges, as the result of mechanical strengthening.

Referring again to the laminate glass article 100 depicted in FIG. 1, the difference in the first CTE of the core glass layer 12 and the second CTE of the plurality of clad glass layers 10a, 10b can drive mechanical strengthening of the laminate glass article 100. In some aspects, the difference in the first CTE of the core glass layer 12 and the second CTE of the plurality of clad glass layers 10a, 10b can range from about $5\times10^{-7}/°$ C. to about $70\times10^{-7}/°$ C., from about $10\times10^{-7}/°$ C. to about $70\times10^{-7}/°$ C., from about $10\times10^{-7}/°$ C. to about $60\times10^{-7}/°$ C., or from about $10\times10^{-7}/°$ C. to about $50\times10^{-7}/°$ C. According to some implementations, each of the plurality of clad glass layers 10a, 10b can have a second CTE from about $30\times10^{-7}/°$ C. to about $70\times10^{-7}/°$ C., from about $33\times10^{-7}/°$ C. to about $65\times10^{-7}/°$ C., and all CTE values between these levels. In further implementations, the core glass layer 12 can have a first CTE from about $70\times10^{-7}/°$ C. to about $110\times10^{-7}/°$ C., from about $75\times10^{-7}/°$ C. to about $103\times10^{-7}/°$ C., and all CTE values between these levels.

Still referring to the laminate glass article 100 depicted in FIG. 1, the viscosity levels of the core glass layer 12 and the plurality of clad glass layers 10a, 10b at elevated temperatures can significantly influence the ability of the laminate glass article 100 to be formed into a desired shape for the intended application according to a sagging process or a co-sagging process. In a sagging process, the laminate glass article 100 can serve as a single ply in the end product shape for the intended applications (e.g., a passenger window for a vehicle). In a co-sagging process, the laminate glass article 100 can serve as one ply laminated to a second ply comprising an SLG sheet with a polymer layer between them (e.g., a polyvinyl butyral layer). Accordingly, the composition of the core glass layer 12 and the plurality of clad glass layers 10a, 10b can be selected (e.g., as informed by the compositions described below in this disclosure) to exhibit appropriate viscosity levels to enable a sagging or co-sagging process. According to some implementations of the laminate glass article 100 depicted in FIG. 1, the core glass layer 12 and the plurality of clad glass layers 10a, 10b can exhibit a viscosity from $10^{8.5}$ Poise to about $10^{14.5}$ Poise at temperatures from about 525° C. to about 720° C., a viscosity from $10^{9.0}$ Poise to about $10^{14.0}$ Poise at temperatures from about 550° C. to about 700° C., and all viscosity levels between these viscosity levels within the stated temperature ranges. According to another implementation of the laminate glass article 100 depicted in FIG. 1, the core glass layer 12 and the plurality of clad glass layers 10a, 10b can exhibit a viscosity level within ±25%, within ±20%, within ±15%, within ±10%, or within ±5% of the viscosity of conventional SLG glass between about 550° C. and 720° C.

In one or more embodiments, the glass composition of the core glass layer 12 and/or the plurality of clad glass layers 10a, 10b of the laminate glass article 100 depicted in FIG. 1 can be selected to exhibit a sag temperature in a range from about 550° C. to about 720° C., from about 600° C. to about 700° C., or from about 620° C. to about 720° C. In one or more embodiments, the glass composition of the core glass layer 12 and/or the plurality of clad glass layers 10a, 10b can be selected to exhibit a sag temperature in a range from about 605° C. to about 720° C., from about 610° C. to about 720° C., from about 615° C. to about 720° C., from about 620° C. to about 720° C., from about 625° C. to about 720° C., from about 630° C. to about 720° C., from about 635° C. to about 720° C., from about 640° C. to about 720° C., from about 645° C. to about 720° C., from about 650° C. to about 720° C., from about 655° C. to about 720° C., from about 660° C. to about 720° C., from about 665° C. to about 720° C., from about 670° C. to about 720° C., from about 620° C. to about 710° C., from about 620° C. to about 700° C., from about 620° C. to about 690° C., from about 620° C. to about 680° C., from about 620° C. to about 670° C., from about 620° C. to about 660° C., from about 620° C. to about 650° C., from about 620° C. to about 710° C., from about 625° C. to about 695° C., from about 625° C. to about 690° C., from about 625° C. to about 685° C., from about 625° C. to about 680° C., from about 625° C. to about 675° C., from about 625° C. to about 670° C., from about 625° C. to about 665° C., from about 625° C. to about 660° C., from about 625° C. to about 655° C., from about 625° C. to about 650° C., from about 630° C. to about 710° C., from about 635° C. to about 710° C., from about 640° C. to about 710° C., from about 645° C. to about 710° C., from about 650° C. to about 710° C., from about 655° C. to about 710° C., from about 660° C. to about 710° C., from about 665° C. to about 710° C., from about 670° C. to about 710° C., from about 675° C. to about 710° C., from about 680° C. to about 710° C., from about 685° C. to about 710° C., or from about 690° C. to about 710° C. In one or more embodiments, the laminate glass article 100, e.g., by selection of the composition and/or the thicknesses of the core glass layer 12 and the plurality of clad glass layers 10a, 10b, can be configured to exhibit a sag temperature in a range from about 600° C. to about 720° C., from about 600° C. to about 700° C., or from about 620° C. to about 720° C.

According to some embodiments, each of the core glass layer 12 and the plurality of clad glass layers 10 comprise a glass composition with properties (e.g., liquidus viscosity, liquidus temperature, and CTE) suitable for formation of the laminate glass article 100 depicted in FIG. 1 using a fusion-draw process as outlined herein (and discussed below in connection with FIG. 3). According to some embodiments of the laminate article 100 depicted in FIG. 1, at least one of the core glass layer 12 and the plurality of clad glass layers 10a, 10b has an aluminosilicate composition that includes: 55% to 80% $SiO_2$, 0.25% to 17.5% $Al_2O_3$; 0% to 20% $B_2O_3$; 2% to 20% $Na_2O$; 0% to 7% $K_2O$; 0% to 5% MgO; 0% to 5% CaO; 0% to 10% SrO; 0% to 12% ZnO; 0% to 1% $SnO_2$; and 0% to 5% $P_2O_5$ (by weight). According to another embodiment of the laminate article 100 depicted in FIG. 1, at least one of the core glass layer 12 and the plurality of clad glass layers 10a, 10b has an aluminosilicate composition that includes: 60% to 75% $SiO_2$, 0.5% to 16% $Al_2O_3$; 0% to 18% $B_2O_3$; 2% to 16% $Na_2O$; 0% to 6% $K_2O$; 0% to 4% MgO; 0% to 4% CaO; 0% to 6% SrO; 0% to 10% ZnO; 0% to 0.5% $SnO_2$; and 0% to 3.5% $P_2O_5$ (by weight).

In some implementations of the laminate glass article 100 depicted in FIG. 1, the plurality of clad glass layers 10a, 10b has an aluminosilicate composition that includes: 55% to 77% $SiO_2$, 0.5% to 11% $Al_2O_3$; 0% to 18% $B_2O_3$; 2% to 9% $Na_2O$; 0% to 3% $K_2O$; 0% to 5% MgO; 0% to 4% CaO; 0% to 11% ZnO; and 0% to 1% $SnO_2$ (by weight). According to another embodiment of the laminate glass article 100 depicted in FIG. 1, the plurality of clad glass layers 10a, 10b has an aluminosilicate composition that includes: 61.1% to 74.2% $SiO_2$, 0.8% to 9.5% $Al_2O_3$; 0% to 16.4% $B_2O_3$; 2.3% to 7.7% $Na_2O$; 0% to 2% $K_2O$; 0% to 3.9% MgO; 0% to 3.1% CaO; 0% to 9.8% ZnO; and 0% to 0.5% $SnO_2$ (by weight).

In some implementations of the laminate glass article 100 depicted in FIG. 1, the core glass layer 12 has an aluminosilicate composition that includes: 57% to 72% $SiO_2$, 9% to 17% $Al_2O_3$; 0% to 1.5% $B_2O_3$; 10% to 18% $Na_2O$; 1% to 7% $K_2O$; 0% to 4% MgO; 0% to 1.5% CaO; 0% to 7% SrO; 0% to 4% ZnO; 0.2% to 1% $SnO_2$; and 0% to 4% $P_2O_5$ (by weight). According to another embodiment of the laminate glass article 100 depicted in FIG. 1, the core glass layer 12 has an aluminosilicate composition that includes: 60% to 69% $SiO_2$, 10.9% to 15.8% $Al_2O_3$; 0% to 1.1% $B_2O_3$; 11.2% to 15.9% $Na_2O$; 1.5% to 5.7% $K_2O$; 0% to 3.1% MgO; 0% to 0.9% CaO; 0% to 6.04% SrO; 0% to 2.5% ZnO; 0.2% to 0.5% $SnO_2$; and 0% to 3.2% $P_2O_5$ (by weight).

Although exemplary embodiments of the glass composition for the core glass layer 12 are described herein, the core glass composition can comprise suitable components in suitable amounts such that the core glass composition is compatible with the glass composition for the plurality of clad glass layers 10a, 10b for formation of the laminate glass article 100 as described herein and depicted in FIG. 1. For example, the liquidus viscosity, liquidus temperature, and/or CTE of the glass composition for the core glass layer 12 relative to those of the glass composition for the plurality of the clad glass layers 10a, 10b can enable formation of the laminate glass article 100 using a fusion-draw process as described herein (see FIG. 3 and corresponding description below).

In the embodiments described herein, the glass composition of the plurality of clad glass layers 10a, 10b and core glass layer 12 comprises $SiO_2$, which can serve as a glass network former. For example, the composition of these layers can comprise from about 55% to about 80% $SiO_2$ (by weight). If the concentration of $SiO_2$ is too low, the glass composition can be incompatible with zircon, which is a common component found in fusion-draw equipment (e.g., in refractory). If the concentration of $SiO_2$ is too high, the glass composition can have an undesirably high durability and can have a sufficiently high melting point to adversely impact the formability of the glass.

In the embodiments described herein, the glass composition of the core glass layer 12 and the plurality of clad glass layers 10a, 10b comprises $Al_2O_3$, which can serve as a glass network former. For example, the glass composition of these layers can comprise from about 0.25% to about 17.5% $Al_2O_3$ (by weight). The presence of $Al_2O_3$ can reduce the liquidus temperature of the glass composition, thereby increasing the liquidus viscosity of the glass composition. If the concentration of $Al_2O_3$ is too low, the glass composition can be undesirably soft (e.g., the strain point can be undesirably low) and can have an undesirably high CTE. If the concentration of $Al_2O_3$ is too high, the glass composition can have an undesirable hardness and be incompatible with any zircon in a refractory or other component in contact with the glass in the fusion-draw equipment.

In some embodiments, the glass composition of the core glass layer 12 and the plurality of clad glass layers 10a, 10b comprises $B_2O_3$, which can serve as a glass network former. For example, the glass composition can comprise from about 0% to about 20% $B_2O_3$ (by weight). The presence of $B_2O_3$ can reduce the durability of the glass composition. Additionally, or alternatively, the presence of $B_2O_3$ can reduce the viscosity and the liquidus temperature of the glass composition. For example, increasing the concentration of $B_2O_3$ by 1% (by weight) can decrease the temperature required to obtain an equivalent viscosity by about 10° C. to about 20° C., depending on the glass composition. However, increasing the concentration of $B_2O_3$ by 1% can lower the liquidus temperature by about 15° C. to about 25° C., depending on the glass composition. Thus, $B_2O_3$ can reduce the liquidus temperature of the glass composition more rapidly than it decreases the liquidus viscosity. If the concentration of $B_2O_3$ is too low, the glass composition can have an undesirable hardness. If the concentration of $B_2O_3$ is too high, the glass composition can be undesirably soft.

In some embodiments, the glass composition of the plurality of clad glass layers 10a, 10b and the core glass layer 12 comprises an alkali metal oxide selected from the group consisting of $Li_2O$, $Na_2O$, $K_2O$, $Rb_2O$, $Cs_2O$, and combinations thereof. For example, the glass composition can comprise from about 2% to about 20% $Na_2O$ (by weight). Additionally, or alternatively, the glass composition can comprise from about 0% to about 7% $K_2O$ (by weight). The alkali metal oxide can serve as a modifier. For example, the presence of $Na_2O$ can reduce the melting temperature of the glass composition, which can enhance the formability of the glass composition. In embodiments comprising Na$_2$O, if the concentration of Na$_2$O is too low, the glass composition can have an undesirable hardness. If the concentration of Na$_2$O is too high, the glass composition can have an undesirably high CTE.

In some embodiments, the glass composition of the plurality of clad glass layers 10a, 10b and the core glass layer 12 comprises an alkaline earth oxide selected from the group consisting of CaO, MgO, SrO, and combinations thereof. For example, the glass composition comprises from about 0% to about 5% CaO (by weight). Additionally, or alternatively, the glass composition comprises from about 0% to about 5% MgO. Additionally, or alternatively, the glass composition comprises from about 0% to about 10% SrO (by weight).

In some embodiments, the glass composition of the plurality of clad glass layers 10a, 10b and the core glass layer 12 comprises a fining agent selected from the group consisting of SnO$_2$, Sb$_2$O$_3$, Ce$_2$O$_3$, Cl (e.g., derived from KCl or NaCl), and combinations thereof. For example, the glass composition comprises from about 0% to about 1% SnO$_2$ (by weight).

In some embodiments, the glass composition of the plurality of clad glass layers 10a, 10b and the core glass layer 12 comprises P$_2$O$_5$. For example, the glass composition comprises from about 0% to about 5% P$_2$O$_5$ (by weight). In other embodiments, the glass composition of the plurality of clad glass layers 10a, 10b and the core glass layer 12 comprises trace amounts of ZrO$_2$. For example, the clad glass composition comprises from about 0% to about 0.025% ZrO$_2$ (by weight).

In some embodiments, the glass composition of the plurality of clad glass layers 10a, 10b and the core glass layer 12 is substantially free of any or all of Pb, As, Cd, and Ba (i.e., constituents comprising the listed elements). For example, the glass composition can be substantially free of Pb. Additionally, or alternatively, the glass composition is substantially free of As. Additionally, or alternatively, the glass composition is substantially free of Cd. Additionally, or alternatively, the glass composition is substantially free of Ba.

Figure 2:
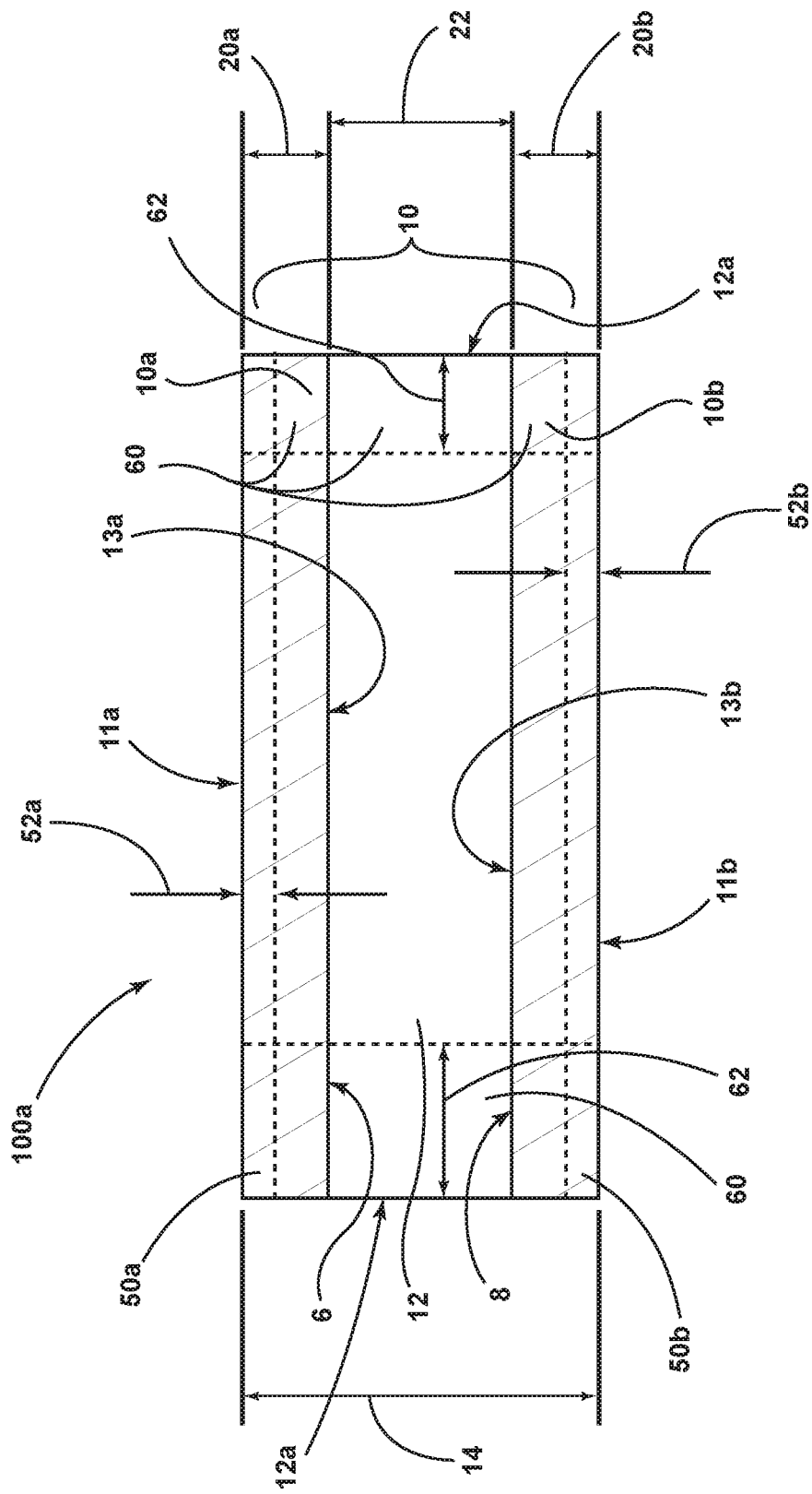
FIG. 2 is a cross-sectional schematic view of a laminate glass article comprising glass core and clad layers, along with one or more ion-exchanged compressive stress regions, according to at least one example of the disclosure.

According to another embodiment of the disclosure, the laminate glass article 100a depicted in FIG. 2 includes one or more ion-exchanged compressive stress regions, e.g., ion-exchanged compressive stress regions 50a, 50b in the clad glass layers 10a, 10b and the ion-exchanged edge compressive stress region 60 in the core glass layer 12 and the clad glass layers 10a, 10b. Unless otherwise noted, the laminate glass article 100a depicted in FIG. 2 is substantially similar to the laminate glass article 100 depicted in FIG. 1, with like-numbered elements having the same or substantially similar structure and function. As it relates to the laminate glass article 100a depicted in FIG. 2, the ion-exchanged compressive stress region 50a is in the clad glass layer 10a, and spans from the first primary surface 11a to a first selected clad depth 52a. Similarly, the ion-exchanged compressive stress region 50b is in the clad glass layer 10b, and spans from the first primary surface 11b to a second selected clad depth 52b. Further, the edge ion-exchanged compressive stress region 60 spans from one or more edges 12a (e.g., any one of the four side edges of the laminate article 100a when configured in a sheet or plate-like form) of the glass article 100a to a selected core depth 62 within the core glass layer 12 and the clad glass layers 10a, 10b.

Referring again to the laminate glass article 100a depicted in FIG. 2, the plurality of clad glass layers 10 (i.e., one or more of the clad glass-ceramic layers 10a, 10b) can be configured with one or more ion-exchanged compressive stress regions 50a, 50b generated from an ion-exchange process; and can also be configured with an ion-exchangeable glass composition (e.g., a glass composition with one or more alkali metal ions, some of which may be exchanged with other alkali metal ions to develop residual compressive stresses). That is, the clad glass layers 10a, 10b, e.g., after lamination with the core glass layer 12, can be configured with an ion-exchanged compressive stress region 50a, 50b to chemically strengthen the laminate glass article 100a by virtue of the development of compressive stress in outer surface regions of the plurality of clad glass layers 10a, 10b (e.g., as in proximity to the primary surfaces 11a and 11b). More particularly, a compressive stress region is developed in the plurality of clad glass layers 10a, 10b such that compressive stress is present at the surface (e.g., primary surfaces 11a, 11b) of the clad glass layers 10a, 10b and through a portion of the clad glass layers 10a, 10b to a particular depth (e.g., selected clad depths 52a, 52b). It should also be understood that the compressive stresses developed through chemical strengthening (e.g., an ion-exchange process) can be in addition to existing residual compressive stresses possessed by the plurality of clad glass layers 10 from mechanical strengthening (e.g., via CTE mismatch between the plurality of clad glass layers 10a, 10b and the core glass layer 12). Accordingly, the compressive stress created at the outer surfaces and near surface regions (e.g., in proximity to the primary surfaces 11a and 11b) of the plurality of clad glass layers 10a, 10b can be comparable to or greater than what can otherwise be achieved by a chemical strengthening process alone and compressive stresses from 500 to 1000 MPa can be readily achieved. According to embodiments of the present disclosure, the first and second selected clad depth 52a, 52b may be the same or may be different.

Referring again to the laminate glass article 100a depicted in FIG. 2, the core glass layer 12 and the clad glass layers 10 (e.g., clad glass layers 10a and 10b) can also be configured with an edge ion-exchanged compressive stress region 60 generated from an ion-exchange process; and can also be configured with an ion-exchangeable glass composition (e.g., a glass composition with one or more alkali metal ions, some of which may be exchanged with other alkali metal ions to develop residual compressive stresses). That is, the core glass layer 12 and the clad glass layers 10, after lamination, can be configured with an edge ion-exchanged compressive stress region 60 to chemically strengthen the laminate glass article 100a by virtue of the development of compressive stress in surface regions of the core glass layer 12 and clad glass layers 10 in proximity to the edges 12a of the laminate article 100a. More particularly, a compressive stress region is developed in the core glass layer 12 and the clad glass layers 10 such that compressive stress is present at the edge surface (e.g., edges 12a) of the core and clad glass layers 10, 12 and through a portion of these layers 10, 12 to a particular depth (e.g., selected core depth 62). It should be understood that the edge ion-exchange compressive stress region 60 can exist in proximity to one or more of the edges 12a of the laminate glass article 100a, within the core glass layer 12 and the clad glass layers 10.

Referring again to the laminate glass article 100a depicted in FIG. 2 with one or more ion-exchanged compressive stress regions, the compressive stress region(s) can extend from the outermost surfaces of the plurality of clad glass layers 10a, 10b (e.g., from the primary surfaces 11a, 11b and/or the edges 12a of the laminate article 100a) and/or the core glass layer 12 (e.g., from the edges 12a of the laminate article 100a) to a selected depth within these layers. As used herein, a "selected depth", "depth of compression", and "DOC" are used interchangeably to define the depth at which the residual stress in the clad glass layers 10a, 10b and/or the core glass layer 12 (i.e., as described herein with an ion-exchanged compressive stress region) changes from compressive to tensile. Unless otherwise noted, DOC is measured by a scattered light polariscope (SCALP). Where the stress in these layers 10a, 10b and/or 12 having a glass composition is generated by exchanging potassium ions into the glass layer, a surface stress meter is used to measure DOC. Where the stress is generated by exchanging sodium ions into the glass layer, SCALP is used to measure DOC. Where the stress in the glass layers 10a, 10b and/or 12 is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass layers is measured by a surface stress meter. To the extent that the above SCALP approaches are unsuccessful in measuring DOC and stress levels in these laminate glass articles 100a, the RNF approach outlined earlier may also be employed to determine these attributes. As also used herein, the "maximum compressive stress" is defined as the maximum compressive stress within the ion-exchanged compressive stress region(s) in the clad glass layers 10a, 10b and/or the core glass layer 12, as the case may be. In some embodiments, the maximum compressive stress is obtained at or in close proximity to the one or more primary surfaces (e.g., primary surfaces 11a, 11b of the clad glass layers 10a, 10b and/or the edges 12a of the laminate glass article 100a) defining the ion-exchanged compressive stress region(s). In other embodiments, the maximum compressive stress is obtained between the one or more primary surfaces and the selected depth of the ion-exchanged compressive stress region in these clad glass layers 10a, 10b, and/or core glass layer 12.

In some embodiments, as depicted in exemplary form in FIG. 2, the laminate glass article 100a may also include one or more ion-exchanged compressive stress regions within the plurality of clad glass layers 10a, 10b and/or core glass layer 12 that extend from one or more of the primary surfaces 11a, 11b and/or edges 12a to a selected clad depth 52a, 52b and/or a selected core depth 62 having a maximum compressive stress of greater than about 150 MPa, greater than 200 MPa, greater than 250 MPa, greater than 300 MPa, greater than 350 MPa, greater than 400 MPa, greater than 450 MPa, greater than 500 MPa, greater than 550 MPa, greater than 600 MPa, greater than 650 MPa, greater than 700 MPa, greater than 750 MPa, greater than 800 MPa, greater than 850 MPa, greater than 900 MPa, greater than 950 MPa, greater than 1000 MPa, and all maximum compressive stress levels between these values. In some embodiments, the maximum compressive stress is 2000 MPa or lower. In addition, the depth of compression (DOC) or selected depth can be set at 10 µm or greater, 15 µm or greater, 20 µm or greater, 25 µm or greater, 30 µm or greater, 35 µm or greater, and to even higher depths, depending on the thickness of the plurality of clad glass layers 10a, 10b and/or core glass layer 12, and the processing conditions associated with generating the compressive stress region. In some embodiments, the DOC is less than or equal to 0.3 times the thicknesses (t) 20a, 20b of each the clad glass-ceramic layers 10a, 10b, for example 0.3 t, 0.28 t, 0.26 t, 0.25 t, 0.24 t, 0.23 t, 0.22 t, 0.21 t, 0.20 t, 0.19 t, 0.18 t, 0.15 t, or 0.1 t.

In some implementations, the laminate glass article 100a (see FIG. 2) is formed with compressive stresses from both a mechanical strengthening process (e.g., via CTE mismatch of the core and clad glass layers) and a chemical strengthening process (e.g., via an ion-exchange process), which can result in a compressive stress region that runs through the entire thickness of the clad glass layers and has high residual compressive stresses in proximity to the outer surfaces of the clad glass layers. The resulting laminate glass article 100a has a higher combined compressive stress (CS) level within its clad glass layers than the CS levels in the clad glass layers that can be achieved using either mechanical or chemical strengthening processes alone. In some embodiments, the laminate glass article 100a is subjected to mechanical strengthening through CTE mismatch of the core glass and clad glass-ceramic layers 12, 10a, 10b such that each of the plurality of clad glass layers 10a, 10b has compressive stress (CS) at its outer surfaces of over 50 MPa, over 250 MPa, in a range from about 50 MPa to about 400 MPa, from about 50 MPa to about 300 MPa, from about 250 MPa to about 600 MPa, or from about 100 MPa to about 300 MPa. Further, in some embodiments, the laminate glass article 100a is subjected to a chemical strengthening from an ion exchange process (in addition to being subjected to mechanical strengthening) such that each of the plurality of clad glass layers 10 has a compressive stress region with a CS of 200 MPa or greater, 300 MPa or greater, 400 MPa or greater, 500 MPa or greater, 600 MPa or greater, 700 MPa or greater, 800 MPa or greater, 900 MPa or greater, a range from 200 MPa to about 1000 MPa, or from about 200 MPa to about 800 MPa. In embodiments of the laminate glass article 100a subjected to both mechanical and chemical strengthening, each of the plurality of clad glass layers 10a, 10b can have a compressive stress (CS) at its outer surfaces as high as 700 MPa to 1000 MPa (e.g., about 300 MPa from mechanical strengthening and about 700 MPa from chemical strengthening).

In some embodiments, a display (e.g., an LED or LCD display) comprises a laminate glass article 100 or 100a as described herein (see FIGS. 1 and 2, and corresponding description above). For example, the display comprises a cover glass comprising the laminate glass article 100 or 100a. In some embodiments, the cover glass comprises an integrated cover glass and color filter. In some embodiments, the cover glass comprises an integrated touch cover glass.

In some embodiments, an automotive glazing comprises a laminate glass article 100, 100a as described herein (see FIGS. 1 and 2, and corresponding description above). The automotive glazing comprises, for example, a windshield, a sidelite (e.g., a door glass or a quarter window), a sun roof, a moon roof, a rear backlite, or another suitable glass or window. In some embodiments, an architectural panel comprises a laminate glass article 100, 100a as described herein.

Various embodiments of the laminate glass articles 100, 100a (see FIGS. 1 and 2) described herein can be used for a variety of applications including, for example, for cover glass or glass backplane applications in consumer or commercial electronic devices including, for example, LCD and LED displays, computer monitors, and automated teller machines (ATMs); for touch screen or touch sensor applications; for portable electronic devices including, for example, mobile telephones, personal media players, and tablet computers; for integrated circuit applications including, for example, semiconductor wafers; for photovoltaic applications; for architectural glass applications; for automotive or vehicular glass applications; for commercial or household appliance applications; or for lighting applications including, for example, solid state lighting (e.g., luminaires for LED lamps).

The laminate glass article 100 depicted in FIG. 1 can be formed using a suitable process (e.g., a fusion-draw, down-draw, slot-draw, up-draw, rolling, or offline lamination process) as would be understood by those of ordinary skill in the field of this disclosure. As also noted above, the laminate glass article 100, thus formed according to one of the foregoing processes, can be subjected to ion-exchange processing to define a laminate glass article 100a (see FIG. 2). In some embodiments, the laminate glass article 100 can be formed using a fusion-draw process. As shown in FIG. 3, one exemplary embodiment of a laminate overflow distributor apparatus 200 can be used to form the laminate glass article 100 (see also FIG. 1) using a fusion-draw process. Apparatus 200 is configured generally as described in U.S. Pat. No. 4,214,886, which is incorporated by reference herein in its entirety. Apparatus 200 comprises a lower overflow distributor 220 positioned beneath an upper overflow distributor 240. Lower overflow distributor 220 comprises a trough 222. A first glass composition 224 (e.g., the glass composition of the core glass layer 12) is melted and fed into trough 222 in a viscous state. First glass composition 224 forms the core glass layer 12 of the laminated glass article 100. Upper overflow distributor 240 comprises a trough 242. A second glass composition 244 (e.g., the glass composition of the clad glass layers 10a, 10b) is melted and fed into trough 242 in a viscous state. Second glass composition 244 forms the clad glass layers 10a and 10b of the laminate glass article 100.

Figure 3:
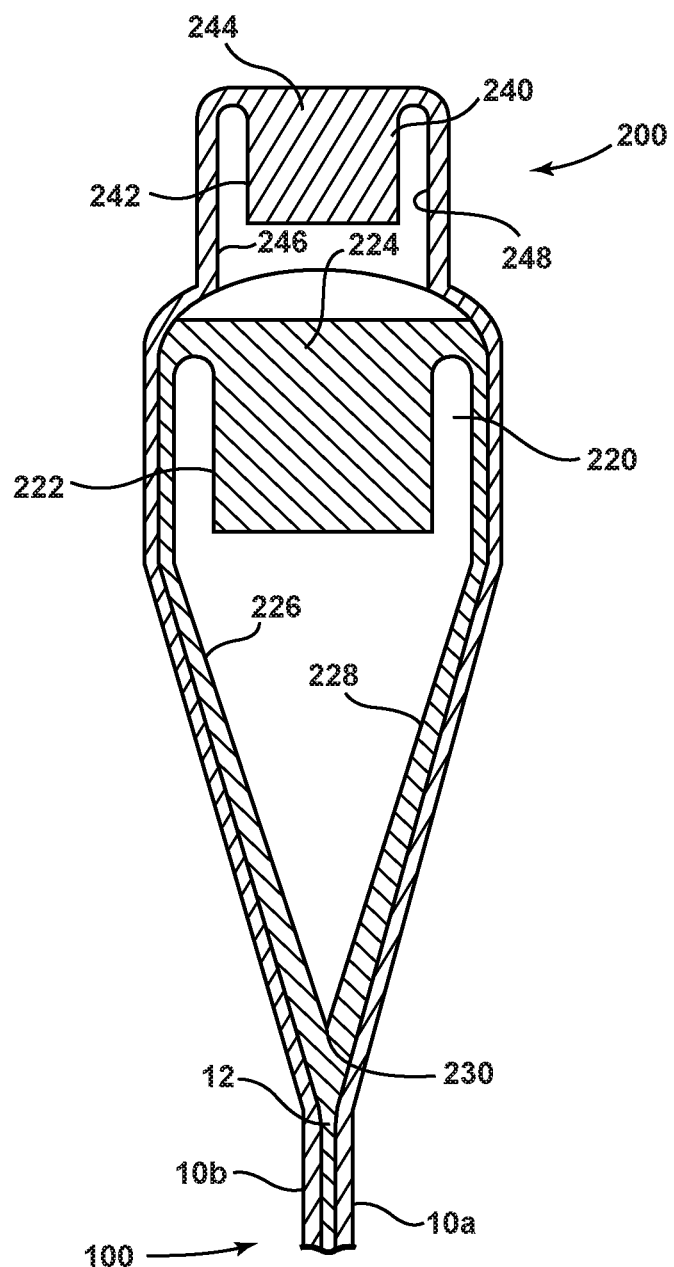
FIG. 3 is a cross-sectional schematic view plot of a laminate overflow distributor apparatus for making laminate glass articles, according to at least one example of the disclosure.

Referring again to the laminate overflow distributor apparatus 200 depicted in FIG. 3, the first glass composition 224 overflows trough 222 and flows down opposing outer forming surfaces 226 and 228 of lower overflow distributor 220. Outer forming surfaces 226 and 228 converge at a draw line 230. The separate streams of first glass composition 224 flowing down respective outer forming surfaces 226 and 228 of lower overflow distributor 220 converge at draw line 230 where they are fused together to form the core glass 12 of the laminate glass article 100.

Still referring to the laminate overflow distributor apparatus 200 depicted in FIG. 3, the second glass composition 244 overflows trough 242 and flows down opposing outer forming surfaces 246 and 248 of upper overflow distributor 240. Second glass composition 244 is deflected outward by upper overflow distributor 240 such that the second glass composition flows around lower overflow distributor 220 and contacts first glass composition 224 flowing over outer forming surfaces 226 and 228 of the lower overflow distributor 220. The separate streams of second glass composition 244 are fused to the respective separate streams of first glass composition 224 flowing down respective outer forming surfaces 226 and 228 of lower overflow distributor 220. Upon convergence of the streams of first glass composition 224 at draw line 230, second glass composition 244 forms the clad glass layers 10a and 10b of the laminate glass article 100.

In some embodiments, the laminate glass article 100 is part of a glass ribbon traveling away from draw line 230 of lower overflow distributor 220, as shown in FIG. 3. The glass sheet is severed to separate the laminated glass articles 100 therefrom. Thus, the laminated glass articles 100 can be cut from the glass sheet produced from the laminate overflow distributor apparatus 200 depicted in FIG. 3. The glass sheet can be severed using a suitable technique such as, for example, scoring, bending, thermally shocking, and/or laser cutting.

Although the laminate glass articles 100 and 100a depicted in FIGS. 1 and 2 comprise three layers, other embodiments are included in this disclosure. In other embodiments, the laminate glass articles 100 and 100a can have a number of layers, such as two, four, or more layers, that are not otherwise depicted in FIGS. 1 and 2. For example, one of the first cladding layer 10a or the second cladding layer 10b can be omitted such that the laminate glass article 100 or 100a comprises a two-layer glass sheet consisting of a core glass layer 12 and one of the clad glass layers 10a or 10b. A laminated glass article 100 or 100a comprising two layers can be formed using two overflow distributors (see, e.g., the laminate overflow distributor apparatus 200 depicted in FIG. 3) positioned so that the two layers are joined while traveling away from the respective draw lines of the overflow distributors or using a single overflow distributor with a divided trough so that two glass compositions flow over opposing outer forming surfaces of the overflow distributor and converge at the draw line of the overflow distributor. A laminate glass article 100 or 100a comprising four or more layers can be formed using additional overflow distributors and/or using overflow distributors with divided troughs. Thus, a laminate glass article 100 or 100a having a determined number of layers can be formed by modifying the overflow distributor accordingly. In some embodiments, one or more intermediate layers are disposed between the core glass layer 12 and a clad glass layer 10a or 10b. Thus, the clad glass layers 10a or 10b can be exterior layers regardless of the total number of layers included in the laminated glass article 100, 100a.

EXAMPLES

The following examples represent certain non-limiting examples of compositions suitable for the clad glass layers 10a, 10b and the core glass layer 12 of the laminate articles 100, 100a, and the methods of making them, as described in the disclosure (see FIGS. 1-3 and corresponding description). In particular, compositions suitable for the core glass layer 12, were prepared according to the batch compositions listed in Table 1 below (the oxides as given in weight percent, wt. %). Similarly, compositions suitable for the plurality of clad glass layers 10 (e.g., clad glass layers 10a and 10b) were prepared according to the batch compositions listed in Table 2 below. Batches of the oxide constituent components were mixed, melted, and formed into glass plates, according to a glass formation process understood by those of ordinary skill in the field of the disclosure. The properties of the glass melt and the resultant glass articles (e.g., core glass layer 12 or clad glass layers 10a, 10b) are measured and reported in Tables 1 and 2 (e.g., softening point, annealing point, CTE, density, liquidus temperature, and liquidus viscosity).

TABLE 1

Exemplary Glass Compositions for Core Glass Layer

| | Examples | | | | | | | |
|---|---|---|---|---|---|---|---|---|
| Composition (wt. %) | 1-1 | 1-2 | 1-3 | 1-4 | 1-5 | 1-6 | 1-7 | 1-8 |
| $SiO_2$ | 62.1 | 61.7 | 61.2 | 60.8 | 60.4 | 60.0 | 67.2 | 61.4 |
| $Al_2O_3$ | 14.2 | 14.1 | 14.1 | 14.0 | 14.0 | 14.0 | 11.0 | 14.1 |
| $B_2O_3$ | 0.0 | 0.0 | 0.0 | 0.0 | 0.0 | 0.0 | 1.0 | 0.9 |
| $Na_2O$ | 16.0 | 15.9 | 15.9 | 15.8 | 15.8 | 15.7 | 13.3 | 14.7 |
| $K_2O$ | 4.37 | 4.35 | 4.34 | 4.33 | 4.31 | 4.30 | 3.80 | 3.86 |
| MgO | 2.49 | 2.48 | 2.48 | 2.47 | 2.46 | 2.45 | 2.51 | 2.50 |
| CaO | 0.07 | 0.07 | 0.07 | 0.07 | 0.07 | 0.07 | 0.0 | 0.0 |
| ZnO | 0.0 | 0.0 | 0.0 | 0.0 | 0.0 | 0.0 | 0.0 | 0.0 |
| $SnO_2$ | 0.23 | 0.23 | 0.23 | 0.23 | 0.23 | 0.22 | 0.48 | 0.47 |
| $P_2O_5$ | 0.55 | 1.09 | 1.63 | 2.17 | 2.71 | 3.24 | 0.0 | 1.47 |
| Softening Pt. (° C.) | 771 | 777 | 779 | 777 | 776 | 778 | 783 | 780 |
| Annealing Pt. (° C.) | 552 | 554 | 556 | 554 | 552 | 552 | 563 | 560 |
| Strain Pt. (° C.) | 505 | 507 | 509 | 506 | 505 | 505 | 517 | 515 |
| CTE ($\times 10^{-7}$/° C.) | 99.7 | 98.8 | 98.9 | 98.6 | 98.7 | 99.2 | 89 | 97 |
| Density (g/cc) | 2.455 | 2.451 | 2.451 | 2.450 | 2.449 | 2.448 | *** | *** |
| Liquidus Temp. (° C.) | <780 | 825 | 845 | 865 | 875 | 1015 | *** | *** |

| | Examples | | | | | | | |
|---|---|---|---|---|---|---|---|---|
| Composition (wt. %) | 1-9 | 1-10 | 1-11 | 1-12 | 1-13 | 1-14 | 1-15 | 1-16 |
| $SiO_2$ | 65.2 | 65.5 | 65.4 | 65.6 | 63.4 | 65.9 | 63.8 | 67.7 |
| $Al_2O_3$ | 14.4 | 12.0 | 12.5 | 11.8 | 15.4 | 14.1 | 15.3 | 12.6 |
| $B_2O_3$ | 1.05 | 1.02 | 0.97 | 0.95 | 0.92 | 0.85 | 0.78 | 0.80 |
| $Na_2O$ | 15.0 | 14.4 | 14.8 | 14.3 | 13.3 | 12.9 | 13.7 | 11.9 |
| $K_2O$ | 1.62 | 2.36 | 2.38 | 2.32 | 3.76 | 3.51 | 3.73 | 5.35 |
| MgO | 0.74 | 2.58 | 2.57 | 2.54 | 0.05 | 0.04 | 0.03 | 1.53 |
| CaO | 0.0 | 0.0 | 0.0 | 0.0 | 0.0 | 0.0 | 0.0 | 0.0 |
| ZnO | 0.0 | 0.0 | 0.0 | 1.23 | 0.0 | 0.0 | 0.0 | 0.0 |
| $SnO_2$ | 0.47 | 0.49 | 0.49 | 0.46 | 0.47 | 0.44 | 0.42 | 0.45 |
| $P_2O_5$ | 0.0 | 0.0 | 0.0 | 0.0 | 0.0 | 0.0 | 0.0 | 0.0 |
| Softening Pt. (° C.) | 775 | 776 | 781 | 780 | 785 | 786 | 786 | 792 |
| Annealing Pt. (° C.) | 564 | 565 | 565 | 570 | 576 | 575 | 573 | 567 |
| Strain Pt. (° C.) | 520 | 519 | 520 | 525 | 532 | 531 | 529 | 521 |
| CTE ($\times 10^{-7}$/° C.) | 87 | 87 | 91 | 89 | 91 | 91 | 88 | 89 |
| Density (g/cc) | *** | *** | *** | *** | *** | *** | *** | *** |
| Liquidus Temp. (° C.) | *** | *** | *** | *** | *** | *** | *** | *** |

| | Examples | | | | | | | |
|---|---|---|---|---|---|---|---|---|
| Composition (wt. %) | 1-17 | 1-18 | 1-19 | 1-20 | 1-21 | 1-22 | 1-23 | 1-24 |
| $SiO_2$ | 66.9 | 66.5 | 67.8 | 67.5 | 66.5 | 65.0 | 61.5 | 64.0 |
| $Al_2O_3$ | 11.4 | 11.8 | 12.7 | 12.1 | 13.4 | 15.8 | 15.7 | 13.2 |
| $B_2O_3$ | 0.93 | 1.03 | 0.80 | 1.00 | 0.90 | 0.93 | 0.73 | 1.01 |
| $Na_2O$ | 11.7 | 12.0 | 12.2 | 13.1 | 11.9 | 13.1 | 13.5 | 12.3 |
| $K_2O$ | 5.48 | 5.46 | 4.65 | 3.46 | 5.23 | 4.58 | 5.19 | 5.43 |
| MgO | 2.76 | 3.08 | 2.13 | 2.65 | <0.005 | <0.005 | 0.91 | 2.95 |
| CaO | 0.0 | 0.0 | 0.0 | 0.0 | 0.0 | 0.0 | 0.0 | 0.0 |
| ZnO | 0.0 | 0.0 | 0.0 | 0.0 | 2.46 | 0.0 | 0.60 | 0.0 |
| $SnO_2$ | 0.46 | 0.48 | 0.46 | 0.49 | 0.45 | 0.44 | 0.41 | 0.46 |
| $P_2O_5$ | 0.0 | 0.0 | 0.0 | 0.0 | 0.0 | 1.10 | 1.85 | 0.0 |
| Softening Pt. (° C.) | 801 | 803 | 800 | 790 | 791 | 779 | 780 | 801 |
| Annealing Pt. (° C.) | 570 | 577 | 574 | 572 | 564 | 562 | 559 | 573 |
| Strain Pt. (° C.) | 522 | 529 | 527 | 525 | 518 | 516 | 514 | 526 |
| CTE ($\times 10^{-7}$/° C.) | 85 | 93 | 92 | 89 | 90 | 93 | 99.6 | 90 |
| Density (g/cc) | *** | *** | *** | *** | *** | *** | *** | *** |
| Liquidus Temp. (° C.) | *** | *** | *** | *** | *** | *** | *** | *** |

| | Examples | | | | | | | |
|---|---|---|---|---|---|---|---|---|
| Composition (wt. %) | 1-25 | 1-26 | 1-27 | 1-28 | 1-29 | 1-30 | 1-31 | 1-32 |
| $SiO_2$ | 67.6 | 67.1 | 66.6 | 66.2 | 66.9 | 66.3 | 66.9 | 67.3 |
| $Al_2O_3$ | 11.0 | 11.0 | 11.0 | 11.0 | 11.0 | 10.9 | 12.7 | 12.7 |
| $B_2O_3$ | 1.10 | 1.10 | 1.10 | 1.10 | 1.10 | 1.09 | 1.07 | 1.07 |
| $Na_2O$ | 12.5 | 13.0 | 13.5 | 14.0 | 12.5 | 12.5 | 13.7 | 13.7 |
| $K_2O$ | 4.22 | 4.22 | 4.22 | 4.22 | 4.95 | 5.68 | 4.01 | 3.33 |
| MgO | 2.41 | 2.41 | 2.41 | 2.41 | 2.40 | 2.40 | 0.92 | 1.24 |
| CaO | 0.88 | 0.88 | 0.88 | 0.88 | 0.88 | 0.88 | 0.0 | 0.0 |
| ZnO | 0.0 | 0.0 | 0.0 | 0.0 | 0.0 | 0.0 | 0.0 | 0.0 |
| $SnO_2$ | 0.24 | 0.24 | 0.24 | 0.24 | 0.24 | 0.24 | 0.51 | 0.50 |
| $P_2O_5$ | 0.0 | 0.0 | 0.0 | 0.0 | 0.0 | 0.0 | 0.0 | 0.0 |
| Softening Pt. (° C.) | 781 | 773 | 768 | 759 | 774 | 772 | 763 | 773 |

TABLE 1-continued

Exemplary Glass Compositions for Core Glass Layer

| | | | | | | | | |
|---|---|---|---|---|---|---|---|---|
| Annealing Pt. (° C.) | 563 | 558 | 552 | 550 | 559 | 553 | 546 | 554 |
| Strain Pt. (° C.) | 518 | 512 | 507 | 506 | 513 | 507 | 501 | 508 |
| CTE (×$10^{-7}$/° C.) | 86.8 | 87.4 | 90.3 | 91.3 | 88.3 | 89.9 | 90.6 | 89.2 |
| Density (g/cc) | 2.44 | 2.44 | 2.44 | 2.44 | 2.44 | 2.44 | 2.44 | 2.44 |
| Liquidus Temp. (° C.) | 905 | 890 | 865 | 840 | 855 | 855 | 870 | 875 |

| | Examples | | | | | | | |
|---|---|---|---|---|---|---|---|---|
| Composition (wt. %) | 1-33 | 1-34 | 1-35 | 1-36 | 1-37 | 1-38 | 1-39 | 1-40 |
| $SiO_2$ | 67.5 | 66.8 | 69.0 | 68.8 | 67.3 | 66.8 | 66.8 | 67.0 |
| $Al_2O_3$ | 12.77 | 12.02 | 10.98 | 10.96 | 12.50 | 12.61 | 12.65 | 12.69 |
| $B_2O_3$ | 1.07 | 1.08 | 1.09 | 1.09 | 1.02 | 1.07 | 1.07 | 1.07 |
| $Na_2O$ | 13.8 | 14.0 | 11.7 | 11.9 | 12.4 | 12.3 | 11.9 | 11.2 |
| $K_2O$ | 2.71 | 3.38 | 4.02 | 4.36 | 5.24 | 5.31 | 5.33 | 5.32 |
| MgO | 1.56 | 2.22 | 2.52 | 2.21 | 0.90 | 1.23 | 1.60 | 1.88 |
| CaO | 0.0 | 0.0 | 0.0 | 0.0 | 0.0 | 0.0 | 0.0 | 0.0 |
| ZnO | 0.0 | 0.0 | 0.0 | 0.0 | 0.0 | 0.0 | 0.0 | 0.0 |
| $SnO_2$ | 0.50 | 0.50 | 0.51 | 0.51 | 0.50 | 0.49 | 0.50 | 0.51 |
| $P_2O_5$ | 0.0 | 0.0 | 0.0 | 0.0 | 0.0 | 0.0 | 0.0 | 0.0 |
| Softening Pt. (° C.) | 785 | 781 | 806 | 794 | 758 | 774 | 785 | 798 |
| Annealing Pt. (° C.) | 562 | 555 | 569 | 559 | 547 | 550 | 559 | 571 |
| Strain Pt. (° C.) | 517 | 509 | 522 | 512 | 501 | 503 | 513 | 524 |
| CTE (×$10^{-7}$/° C.) | 87.6 | 91.4 | 85.8 | 86.8 | 91.0 | 91.1 | 89.5 | 87.8 |
| Density (g/cc) | 2.432 | 2.440 | 2.422 | 2.425 | 2.434 | 2.433 | 2.431 | 2.428 |
| Liquidus Temp. (° C.) | 900 | 835 | 910 | 810 | 855 | 835 | 870 | 855 |

| | Examples | | | | | | | |
|---|---|---|---|---|---|---|---|---|
| Composition (wt. %) | 1-41 | 1-42 | 1-43 | 1-44 | 1-45 | 1-46 | 1-47 | 1-48 |
| $SiO_2$ | 69.0 | 68.5 | 61.0 | 61.8 | 60.5 | 62.1 | 65.6 | 64.8 |
| $Al_2O_3$ | 11.0 | 11.0 | 14.2 | 14.2 | 15.3 | 15.0 | 12.0 | 11.9 |
| $B_2O_3$ | 1.07 | 1.09 | 1.00 | 1.04 | 0.98 | 1.03 | 1.07 | 1.00 |
| $Na_2O$ | 12.5 | 11.5 | 15.2 | 15.4 | 13.7 | 13.5 | 14.9 | 14.8 |
| $K_2O$ | 3.71 | 5.08 | 3.83 | 3.83 | 5.16 | 5.14 | 2.37 | 2.35 |
| MgO | 2.21 | 2.23 | 2.48 | 2.51 | 0.86 | 0.87 | 2.61 | 2.58 |
| CaO | 0.0 | 0.0 | 0.0 | 0.0 | 0.0 | 0.0 | 0.0 | 0.0 |
| ZnO | 0.0 | 0.0 | 0.0 | 0.0 | 0.53 | 0.53 | 0.0 | 0.0 |
| $SnO_2$ | 0.50 | 0.52 | 0.50 | 0.50 | 0.47 | 0.47 | 0.51 | 0.50 |
| $P_2O_5$ | 0.0 | 0.0 | 1.47 | 0.53 | 2.03 | 1.01 | 0.0 | 1.06 |
| Softening Pt. (° C.) | 789 | 786 | 769 | 772 | 788 | 783 | 775 | 773 |
| Annealing Pt. (° C.) | 563 | 561 | 562 | 561 | 565 | 563 | 563 | 565 |
| Strain Pt. (° C.) | 516 | 513 | 518 | 517 | 519 | 517 | 519 | 521 |
| CTE (×$10^{-7}$/° C.) | 86.7 | 87.3 | 99.4 | 99.4 | 98 | 97.3 | 91.7 | 92.3 |
| Density (g/cc) | 2.427 | 2.428 | 2.457 | 2.459 | 2.456 | 2.454 | 2.453 | 2.445 |
| Liquidus Temp. (° C.) | 835 | 830 | 835 | 840 | 870 | 850 | 885 | 880 |
| Liquidus Viscosity (kP) | 6239 | 8954 | 4446 | 4046 | 2884 | 3394 | 1202 | 1387 |

TABLE 2

Exemplary Glass Compositions for Clad Glass Layers

| | Examples | | | | | | | |
|---|---|---|---|---|---|---|---|---|
| Composition (wt. %) | 2-1 | 2-2 | 2-3 | 2-4 | 2-5 | 2-6 | 2-7 | 2-8 |
| $SiO_2$ | 69.8 | 68.5 | 67.6 | 66.8 | 66.6 | 65.3 | 61.1 | 66.2 |
| $Al_2O_3$ | 5.7 | 5.7 | 5.6 | 5.5 | 5.7 | 4.9 | 9.5 | 1.6 |
| $B_2O_3$ | 13.0 | 12.9 | 12.8 | 12.5 | 15.0 | 11.9 | 11.8 | 14.0 |
| $Na_2O$ | 4.9 | 4.9 | 4.9 | 4.9 | 4.9 | 7.6 | 7.5 | 7.7 |
| $K_2O$ | 0.0 | 0.0 | 0.0 | 0.0 | 0.0 | 0.0 | 0.0 | 0.0 |
| MgO | 3.9 | 2.6 | 1.3 | 0.0 | 2.6 | 3.3 | 3.2 | 3.3 |
| CaO | 0.0 | 0.0 | 0.0 | 0.0 | 0.0 | 0.0 | 0.0 | 0.0 |
| ZnO | 2.6 | 5.1 | 7.5 | 9.8 | 5.1 | 6.4 | 6.2 | 6.5 |
| $SnO_2$ | 0.0 | 0.0 | 0.0 | 0.0 | 0.0 | 0.5 | 0.5 | 0.5 |
| Softening Pt. (° C.) | 833 | 825 | 819 | 806 | 811 | 744 | 778 | 724 |
| Annealing Pt. (° C.) | 583 | 577 | 573 | 563 | 565 | 561 | 576 | 558 |
| Strain Pt. (° C.) | 532 | 524 | 519 | 509 | 516 | 521 | 530 | 521 |
| CTE (×$10^{-7}$/° C.) | 44.9 | 43.9 | 42.8 | 41.3 | 44.3 | 54.6 | 56.9 | 53.1 |
| Density (g/cc) | 2.325 | 2.35 | 2.374 | 2.397 | 2.34 | 2.44 | 2.437 | 2.44 |
| Liquidus Temp. (° C.) | 1210 | 1050 | 1080 | 1130 | 1015 | 990 | 1045 | 1035 |
| Liquidus Viscosity (kP) | 16 | 187 | 91 | 41 | 220 | 58 | 45 | 9 |

TABLE 2-continued

Exemplary Glass Compositions for Clad Glass Layers

| | Examples | | | | | | | |
|---|---|---|---|---|---|---|---|---|
| Composition (wt. %) | 2-9 | 2-10 | 2-11 | 2-12 | 2-13 | 2-14 | 2-15 | 2-16 |
| $SiO_2$ | 63.6 | 69.7 | 69.7 | 74.2 | 69.9 | 69.5 | 74.0 | 69.7 |
| $Al_2O_3$ | 4.9 | 8.0 | 8.0 | 3.3 | 8.0 | 8.0 | 3.3 | 8.0 |
| $B_2O_3$ | 13.8 | 16.4 | 16.4 | 14.5 | 14.2 | 16.4 | 14.5 | 14.2 |
| $Na_2O$ | 7.6 | 3.9 | 3.9 | 6.0 | 5.8 | 2.9 | 5.0 | 4.9 |
| $K_2O$ | 0.0 | 0.0 | 0.0 | 0.0 | 0.0 | 1.5 | 1.5 | 1.5 |
| MgO | 3.2 | 0.0 | 0.0 | 0.0 | 0.0 | 0.6 | 0.7 | 0.6 |
| CaO | 0.0 | 1.8 | 1.8 | 1.8 | 1.8 | 0.9 | 0.9 | 0.9 |
| ZnO | 6.4 | 6.2 | 0.0 | 0.0 | 0.0 | 0.0 | 0.0 | 0.0 |
| $SnO_2$ | 0.5 | 0.5 | 0.2 | 0.2 | 0.2 | 0.2 | 0.2 | 0.2 |
| Softening Pt. (° C.) | 731 | 770 | 850 | 788 | 813 | 899 | 788 | 812 |
| Annealing Pt. (° C.) | 557 | 573 | 569 | 584 | 574 | 572 | 566 | 564 |
| Strain Pt. (° C.) | 518 | 529 | 517 | 536 | 528 | 517 | 524 | 517 |
| CTE ($\times 10^{-7}$/° C.) | 54.5 | 56.5 | 38.4 | 41.5 | 44.2 | 38.9 | 41.1 | 45.1 |
| Density (g/cc) | 2.437 | 2.428 | 2.23 | 2.3 | 2.28 | 2.22 | 2.264 | 2.26 |
| Liquidus Temp. (° C.) | 945 | 1030 | *** | *** | *** | *** | 1020 | *** |
| Liquidus Viscosity (kP) | 94 | 35 | *** | *** | *** | *** | 134 | *** |

| | Examples | | | | | | | |
|---|---|---|---|---|---|---|---|---|
| Composition (wt. %) | 2-17 | 2-18 | 2-19 | 2-20 | 2-21 | 2-22 | 2-23 | 2-24 |
| $SiO_2$ | 65.4 | 66.3 | 67.3 | 68.2 | 68.6 | 69.1 | 72.5 | 72.0 |
| $Al_2O_3$ | 3.2 | 3.2 | 3.2 | 3.3 | 3.3 | 3.3 | 0.8 | 3.2 |
| $B_2O_3$ | 14.4 | 13.9 | 13.4 | 13.1 | 14.0 | 14.2 | 16.0 | 14.3 |
| $Na_2O$ | 5.7 | 5.2 | 4.7 | 4.3 | 5.3 | 5.2 | 2.3 | 2.3 |
| $K_2O$ | 0.0 | 0.0 | 0.0 | 0.0 | 0.0 | 0.0 | 2.0 | 1.9 |
| MgO | 1.9 | 1.9 | 1.9 | 1.9 | 1.9 | 2.0 | 0.3 | 0.3 |
| CaO | 0.4 | 0.4 | 0.4 | 0.4 | 0.4 | 2.3 | 0.0 | 0.0 |
| ZnO | 8.5 | 8.5 | 8.6 | 8.5 | 4.9 | 3.3 | 5.2 | 5.2 |
| $SnO_2$ | 0.5 | 0.5 | 0.5 | 0.5 | 0.5 | 0.5 | 0.5 | 0.5 |
| Softening Pt. (° C.) | 758 | 778 | 805 | 833 | 782 | 795 | 781.9 | 803 |
| Annealing Pt. (° C.) | 577 | 576 | 578 | 586 | 578 | 585 | 585 | 554 |
| Strain Pt. (° C.) | 526 | 523 | 525 | 530 | 526 | 536 | 525 | 498 |
| CTE ($\times 10^{-7}$/° C.) | 46.0 | 44.6 | 42.5 | 39.9 | 43.8 | 46.0 | *** | 37.3 |
| Density (g/cc) | 2.429 | 2.42 | 2.412 | 2.404 | 2.376 | 2.369 | 2.301 | 2.303 |
| Liquidus Temp. (° C.) | 1005 | 1015 | 1065 | 1040 | 1030 | 1090 | 1010 | 1025 |
| Liquidus Viscosity (kP) | 47 | 61 | 46 | 122 | 65 | 21 | 154 | 366 |

| | Examples | | | | | | | |
|---|---|---|---|---|---|---|---|---|
| Composition (wt. %) | 2-25 | 2-26 | 2-27 | 2-28 | 2-29 | 2-30 | 2-31 | 2-32 |
| $SiO_2$ | 72.7 | 71.8 | 71.3 | 71.9 | 70.3 | 70.0 | 69.1 | 69.0 |
| $Al_2O_3$ | 3.2 | 1.6 | 3.2 | 3.3 | 6.4 | 7.2 | 7.2 | 7.2 |
| $B_2O_3$ | 14.3 | 15.6 | 14.7 | 14.6 | 0.0 | 0.0 | 0.0 | 0.0 |
| $Na_2O$ | 2.3 | 4.3 | 4.3 | 4.3 | 5.2 | 5.7 | 4.8 | 4.8 |
| $K_2O$ | 2.0 | 0.0 | 0.0 | 0.0 | 0.0 | 0.0 | 0.0 | 0.0 |
| MgO | 0.3 | 0.3 | 0.3 | 0.3 | 0.0 | 0.0 | 0.6 | 0.06 |
| CaO | 1.8 | 0.4 | 0.4 | 2.2 | 2.2 | 1.3 | 1.8 | 1.3 |
| ZnO | 2.6 | 5.3 | 5.2 | 2.6 | 0.0 | 0.0 | 1.3 | 1.3 |
| $SnO_2$ | 0.5 | 0.5 | 0.5 | 0.5 | 0.5 | 0.5 | 0.5 | 0.5 |
| Softening Pt. (° C.) | 828 | 787.3 | 799.3 | 806.8 | *** | *** | *** | *** |
| Annealing Pt. (° C.) | 572 | 600 | 569 | 584 | 575 | 560 | 575 | 570 |
| Strain Pt. (° C.) | 516 | 539 | 513 | 531 | 526 | 512 | 524 | 519 |
| CTE ($\times 10^{-7}$/° C.) | *** | *** | 39.2 | 40.5 | 43.3 | 44.4 | 42.6 | 42.5 |
| Density (g/cc) | 2.297 | 2.319 | 2.324 | 2.319 | 2.284 | 2.274 | 2.293 | 2.283 |
| Liquidus Temp. (° C.) | 1005 | 1050 | 1050 | 1070 | 970 | 970 | 940 | *** |
| Liquidus Viscosity (kP) | 418 | 72 | 116 | 53 | 534 | 591 | 2668 | *** |

| | Examples | | | | | | | |
|---|---|---|---|---|---|---|---|---|
| Composition (wt. %) | 2-33 | 2-34 | 2-35 | 2-36 | 2-37 | 2-38 | 2-39 | 2-40 |
| $SiO_2$ | 69.2 | 69.1 | 70.7 | 70.5 | 70.5 | 70.3 | 70.1 | 69.6 |
| $Al_2O_3$ | 7.2 | 7.2 | 4.8 | 4.8 | 4.8 | 4.8 | 5.6 | 7.2 |
| $B_2O_3$ | 0.0 | 0.0 | 0.0 | 0.0 | 0.0 | 0.0 | 0.0 | 0.0 |
| $Na_2O$ | 4.8 | 4.8 | 4.8 | 4.6 | 4.4 | 4.3 | 3.8 | 3.8 |
| $K_2O$ | 0.0 | 0.0 | 0.0 | 0.0 | 0.0 | 0.7 | 2.0 | 2.0 |
| MgO | 0.3 | 0.0 | 0.9 | 0.8 | 0.6 | 0.3 | 0.0 | 0.0 |
| CaO | 2.2 | 3.1 | 0.0 | 0.4 | 0.9 | 0.9 | 1.8 | 1.8 |
| ZnO | 0.6 | 0.0 | 1.9 | 1.9 | 1.9 | 1.9 | 0.0 | 0.0 |
| $SnO_2$ | 0.5 | 0.5 | 0.5 | 0.5 | 0.5 | 0.5 | 0.5 | 0.5 |
| Softening Pt. (° C.) | *** | *** | *** | *** | *** | *** | *** | *** |
| Annealing Pt. (° C.) | 579 | 581 | 551 | 552 | 555 | 552 | 553 | 562 |

TABLE 2-continued

Exemplary Glass Compositions for Clad Glass Layers

| | | | | | | | | |
|---|---|---|---|---|---|---|---|---|
| Strain Pt. (° C.) | 528 | 531 | 501 | 501 | 505 | 502 | 503 | 510 |
| CTE (×10$^{-7}$/° C.) | 42.8 | 43.2 | 39.7 | 39.5 | 39.5 | 41.1 | 44.1 | 44.9 |
| Density (g/cc) | 2.286 | 2.292 | 2.271 | 2.274 | 2.275 | 2.279 | 2.272 | 2.27 |
| Liquidus Temp. (° C.) | 990 | 980 | *** | 900 | 905 | 885 | 930 | 980 |
| Liquidus Viscosity (kP) | 573 | 621 | *** | 3418 | 3243 | 3394 | 880 | 653 |

| | Examples | | | | | |
|---|---|---|---|---|---|---|
| Compositions (wt. %) | 2-41 | 2-42 | 2-43 | 2-44 | 2-45 | 2-46 |
| SiO$_2$ | 70.9 | 71.1 | 70.9 | 70.9 | 70.6 | 69.6 |
| Al$_2$O$_3$ | 4.8 | 4.9 | 5.7 | 5.7 | 5.6 | 5.6 |
| B$_2$O$_3$ | 15.0 | 0.0 | 0.0 | 15.0 | 15.0 | 0.0 |
| Na$_2$O | 4.3 | 4.3 | 3.8 | 4.8 | 3.8 | 3.8 |
| K$_2$O | 0.0 | 0.0 | 0.0 | 0.0 | 0.7 | 0.7 |
| MgO | 0.9 | 0.9 | 0.9 | 0.9 | 0.6 | 0.6 |
| CaO | 1.3 | 1.8 | 1.8 | 0.9 | 1.8 | 2.7 |
| ZnO | 0.6 | 0.0 | 0.0 | 0.0 | 0.0 | 0.0 |
| SnO$_2$ | 0.5 | 0.5 | 0.5 | 0.5 | 0.5 | 0.5 |
| Softening Pt. (° C.) | *** | *** | *** | *** | *** | *** |
| Annealing Pt. (° C.) | 565 | 565 | 575 | 558 | 560 | 570 |
| Strain Pt. (° C.) | 515 | 514 | 522 | 509 | 508 | 519 |
| CTE (×10$^{-7}$/° C.) | 39.5 | 39.7 | 38.6 | 41.3 | 40.6 | 41.7 |
| Density (g/cc) | 2.269 | 2.268 | 2.254 | 2.257 | 2.26 | 2.28 |
| Liquidus Temp. (° C.) | 955 | 975 | 1000 | 950 | 1020 | 970 |
| Liquidus Viscosity (kP) | 1001 | 518 | 742 | 1047 | 314 | 711 |

Referring now to FIGS. 4A-4D, plots of log viscosity (Poise) vs. temperature (° C.) for a selected set of core and clad glass compositions from Tables 1 and 2 are provided, according to examples of the disclosure. In particular, each of these figures includes viscosity versus temperature data of glass compositions intended for core glass and clad glass layers within the co-sagging temperature and viscosity range, namely from $10^{9.5}$ to $10^{13}$ Poise and from 550° C. to 700° C. Further, each of the figures includes viscosity versus temperature data of a conventional soda lime glass (SLG) composition.

Referring again to FIGS. 4A-4D, each of the figures contains estimated viscosity versus temperature data for laminate glass articles having core-to-clad glass ratios of 7 ("r7") and 1 ("r1"). As an example, for a laminated glass article having a core-to-clad glass ratio of 7 (r7), the core thickness is seven times the total clad thickness. Accordingly, for a laminate glass article having a thickness of 1 mm, the core glass layer has a thickness of 0.875 mm and the total thickness of the clad glass layers is 0.125 mm (i.e., each clad glass layer has a thickness of 0.0625 mm).

Figure 4A:
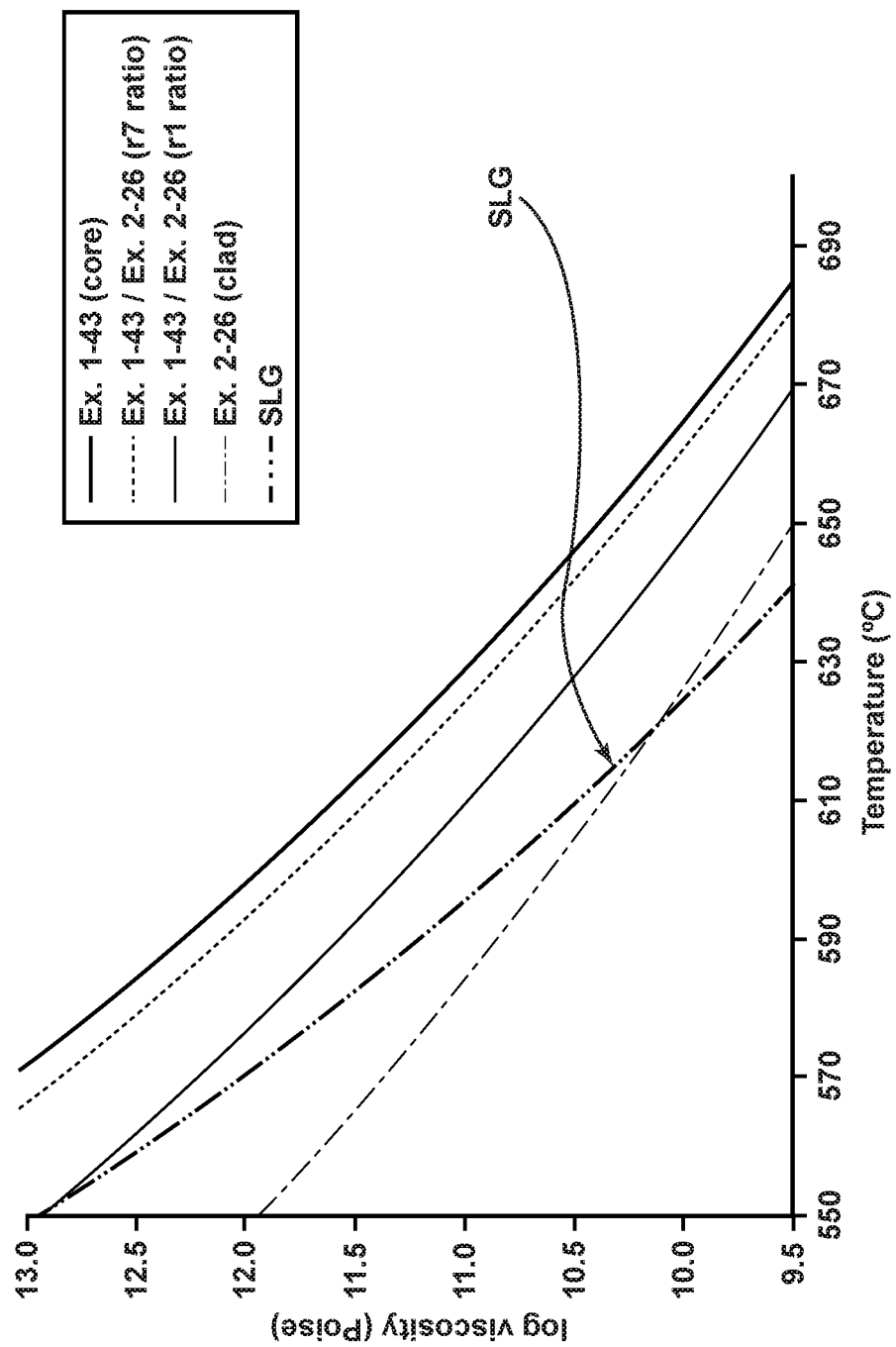
FIGS. 4A-4D are plots of log viscosity (Poise) vs. temperature (° C.) for core and clad glass compositions, according to examples of the disclosure.

As shown in FIG. 4A, viscosity data is presented for the Ex. 1-43 glass composition for a core glass layer (see Table 1) and the Ex. 2-26 glass composition for a clad glass layer (see Table 2). In addition, estimated viscosity curves are presented for laminate glass articles comprising a core glass layer having the Ex. 1-43 glass composition and a plurality of clad glass layers having the Ex. 2-26 glass composition with core-to-clad ratios of 1 (r1) and 7 (r7). As is evident from the viscosity data in FIG. 4A, the viscosity curves of the Ex. 1-43 and Ex. 2-26 glass compositions are substantially similar to the viscosity curve for the conventional soda lime glass (SLG). As such, it is believed that these compositions can be employed to fabricate laminate glass articles (e.g., with r1 or r7 ratios) that can be co-sagged with an SLG layer, e.g., as an inner ply co-sagged with an outer ply comprising an SLG composition.

Figure 4B:
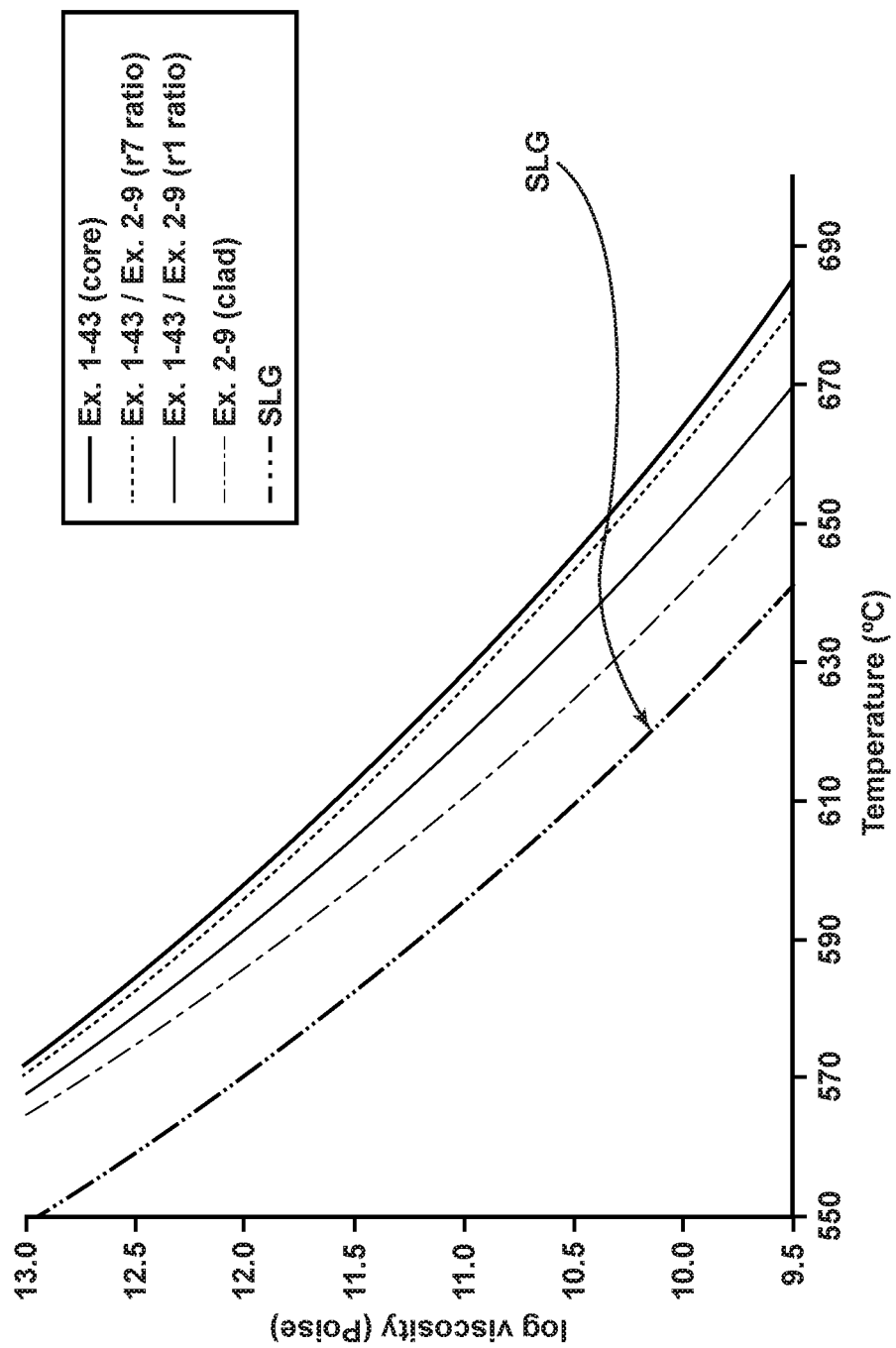

As shown in FIG. 4B, viscosity data is presented for the Ex. 1-43 glass composition for a core glass layer (see Table 1) and the Ex. 2-9 glass composition for a clad glass layer (see Table 2). Estimated viscosity curves are presented for laminate glass articles comprising a core glass layer having the Ex. 1-43 glass composition and a plurality of clad glass layers having the Ex. 2-9 glass composition with core-to-clad ratios of 1 (r1) and 7 (r7). As is evident from the viscosity data in FIG. 4A, the viscosity curves of the Ex. 1-43 and Ex. 2-9 glass compositions are substantially similar to the viscosity curve for the conventional soda lime glass (SLG). As such, it is believed that these compositions can be employed to fabricate laminate glass articles (e.g., with r1 or r7 ratios) that can be co-sagged with an SLG layer, e.g., as an inner ply co-sagged with an outer ply comprising an SLG composition.

Figure 4C:
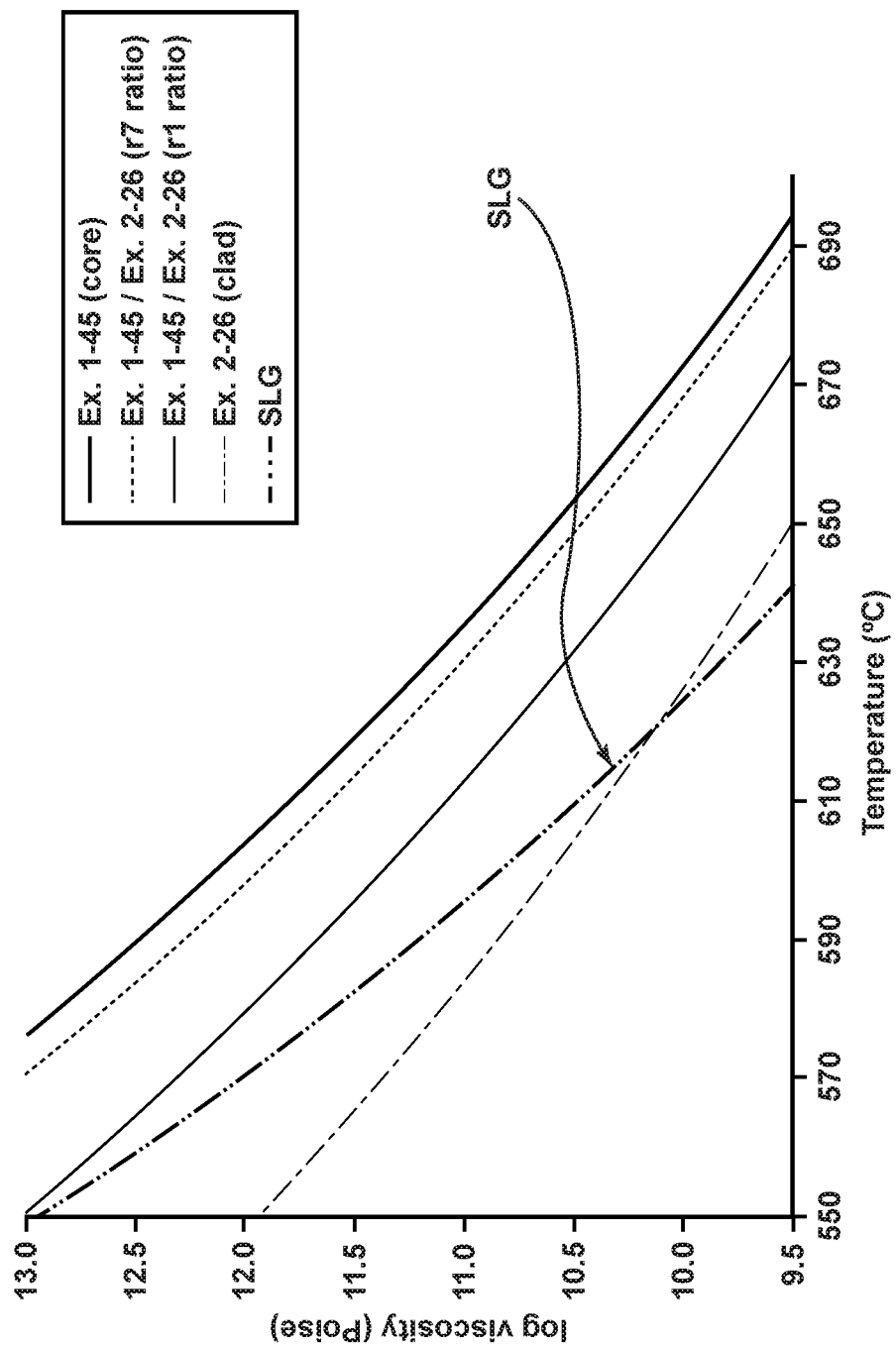

As shown in FIG. 4C, viscosity data is presented for the Ex. 1-45 glass composition for a core glass layer (see Table 1) and the Ex. 2-26 glass composition for a clad glass layer (see Table 2). Estimated viscosity curves are presented for laminate glass articles comprising a core glass layer having the Ex. 1-45 glass composition and a plurality of clad glass layers having the Ex. 2-26 glass composition with core-to-clad ratios of 1 (r1) and 7 (r7). As is evident from the viscosity data in FIG. 4A, the viscosity curves of the Ex. 1-45 and Ex. 2-26 glass compositions are substantially similar to the viscosity curve for the conventional soda lime glass (SLG). As such, it is believed that these compositions can be employed to fabricate laminate glass articles (e.g., with r1 or r7 ratios) that can be co-sagged with an SLG layer, e.g., as an inner ply co-sagged with an outer ply comprising an SLG composition.

Figure 4D:
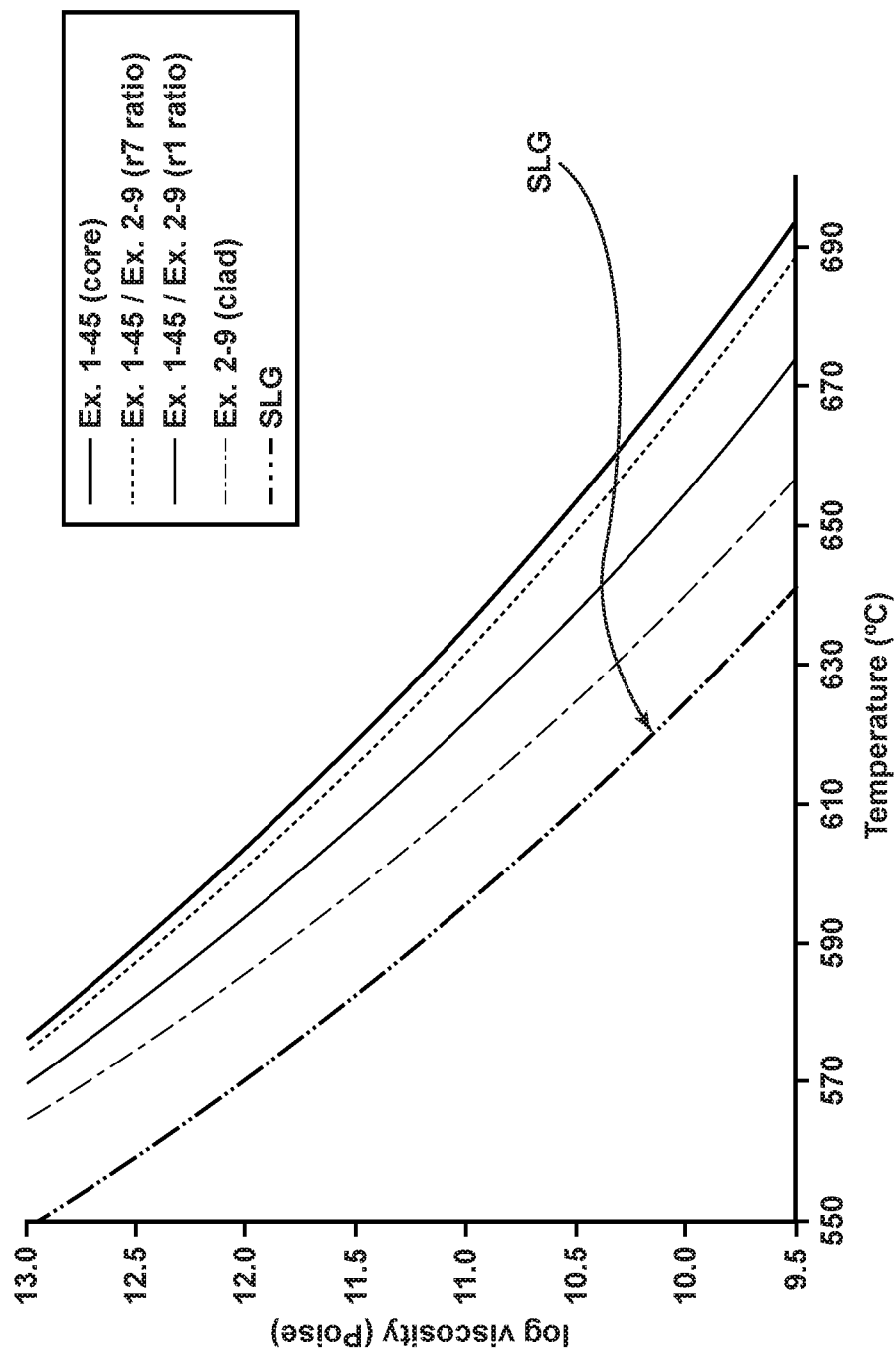

As shown in FIG. 4D, viscosity data is presented for the Ex. 1-45 glass composition for a core glass layer (see Table 1) and the Ex. 2-9 glass composition for a clad glass layer (see Table 2). Estimated viscosity curves are presented for laminate glass articles comprising a core glass layer having the Ex. 1-45 glass composition and a plurality of clad glass layers having the Ex. 2-9 glass composition with core-to-clad ratios of 1 (r1) and 7 (r7). As is evident from the viscosity data in FIG. 4A, the viscosity curves of the Ex. 1-45 and Ex. 2-9 glass compositions are substantially similar to the viscosity curve for the conventional soda lime glass (SLG). As such, it is believed that these compositions can be employed to fabricate laminate glass articles (e.g., with r1 or r7 ratios) that can be co-sagged with an SLG layer, e.g., as an inner ply co-sagged with an outer ply comprising an SLG composition.

According to an aspect (1) of the present disclosure, a laminate glass article is provided. The laminate glass articles comprises: a core glass layer comprising a first coefficient of thermal expansion (CTE); and a plurality of clad glass layers, each comprising a first primary surface, a second primary surface in contact with the core glass layer and a second CTE that is lower than the first CTE of the core glass layer, wherein the difference in the first and second CTE is about $10\times10^{-7}/°$ C. to about $70\times10^{-7}/°$ C., and further wherein each of the core glass layer and the clad glass layers comprises a viscosity from $10^{9.0}$ to $10^{14.0}$ Poise from about 550° C. to about 700° C.

According to an aspect (2) of the present disclosure, the laminate glass article of aspect (1) is provided, wherein each of the plurality of clad glass layers comprises:
58 to 77% $SiO_2$;
0.5 to 11% $Al_2O_3$;
0 to 18% $B_2O_3$;
2 to 9% $Na_2O$;
0 to 3% $K_2O$;
0 to 5% MgO;
0 to 4% CaO;
0 to 11% ZnO; and 0 to 1% $SnO_2$ (by weight).

According to an aspect (3) of the present disclosure, the laminate glass article of aspect (1) is provided, wherein the core glass layer comprises:
57 to 72% $SiO_2$;
9 to 17% $Al_2O_3$;
0 to 1.5% $B_2O_3$;
10 to 18% $Na_2O$;
1 to 7% $K_2O$;
0 to 4% MgO;
0 to 1.5% CaO;
0 to 7% SrO;
0 to 4% ZnO;
0.2 to 1% $SnO_2$; and
0 to 4% $P_2O_5$ (by weight).

According to an aspect (4) of the present disclosure, the laminate glass article of aspect (2) is provided, wherein each of the plurality of clad glass layers comprises a second CTE from about $33\times10^{-7}/°$ C. to about $65\times10^{-7}/°$ C.

According to an aspect (5) of the present disclosure, the laminate glass article of aspect (3) is provided, wherein the core glass layer comprises a first CTE from about $75\times10^{-7}/°$ C. to about $103\times10^{-7}/°$ C.

According to an aspect (6) of the present disclosure, the laminate glass article of aspect (1) is provided, wherein the core glass layer comprises:
61.1 to 74.2% $SiO_2$;
0.8 to 9.5% $Al_2O_3$;
0 to 16.4% $B_2O_3$;
2.3 to 7.7% $Na_2O$;
0 to 2% $K_2O$;
0 to 3.9% MgO;
0 to 3.1% CaO;
0 to 9.8% ZnO; and
0 to 0.5% $SnO_2$ (by weight).

According to an aspect (7) of the present disclosure, the laminate glass article of aspect (1) is provided, wherein the core glass layer comprises:
60 to 69% $SiO_2$;
10.9 to 15.8% $Al_2O_3$;
0 to 1.1% $B_2O_3$;
11.2 to 15.9% $Na_2O$;
1.6 to 5.7% $K_2O$;
0 to 3.1% MgO;
0 to 0.9% CaO;
0 to 6.04% SrO;
0 to 2.5% ZnO;
0.2 to 0.5% $SnO_2$; and
0 to 3.2% $P_2O_5$ (by weight).

According to an aspect (8) of the present disclosure, the laminate glass article of any of aspects (1)-(7) is provided, wherein each of the plurality of clad glass layers further comprises a plurality of ion-exchangeable ions and an ion-exchanged compressive stress region, and further wherein the ion-exchanged compressive stress region is defined from the first primary surface to a first selected depth in each of the plurality of clad glass layers.

According to an aspect (9) of the present disclosure, the laminate glass article of any of aspects (1)-(8) is provided, wherein the laminate glass article comprises an edge ion-exchanged compressive stress region, the edge ion-exchanged compressive stress region defined from an edge of the laminate glass article to a second selected depth in the core and clad glass layers.

According to an aspect (10) of the present disclosure, a laminate glass article is provided. The laminate glass article comprises: a core glass layer comprising a first coefficient of thermal expansion (CTE); and a plurality of clad glass layers, each comprising a first primary surface, a second primary surface in contact with the core glass layer and a second CTE that is lower than the first CTE of the core glass layer, wherein the difference in the first and second CTE is about $10\times10^{-7}/°$ C. to about $70\times10^{-7}/°$ C., wherein each of the core glass layer and the clad glass layers comprises a viscosity from $10^{9.0}$ to $10^{14.0}$ Poise from about 550° C. to about 700° C., and further wherein a total thickness of the plurality of clad glass layers and the core glass layer ranges from about 0.15 mm to about 3 mm.

According to an aspect (11) of the present disclosure, the laminate glass article of aspect (10) is provided, wherein each of the plurality of clad glass layers comprises:
58 to 77% $SiO_2$;
0.5 to 11% $Al_2O_3$;
0 to 18% $B_2O_3$;
2 to 9% $Na_2O$;
0 to 3% $K_2O$;
0 to 5% MgO;
0 to 4% CaO;
0 to 11% ZnO; and
0 to 1% $SnO_2$ (by weight).

According to an aspect (12) of the present disclosure, the laminate glass article of aspect (10) is provided, wherein each of the plurality of clad glass layers comprises:
57 to 72% $SiO_2$;
9 to 17% $Al_2O_3$;
0 to 1.5% $B_2O_3$;
10 to 18% $Na_2O$;
1 to 7% $K_2O$;
0 to 4% MgO;
0 to 1.5% CaO;
0 to 7% SrO;
0 to 4% ZnO;
0.2 to 1% $SnO_2$; and
0 to 4% $P_2O_5$ (by weight).

According to an aspect (13) of the present disclosure, the laminate glass article of aspect (11) is provided, wherein each of the plurality of clad glass layers comprises a second CTE from about $33 \times 10^{-7}/°$ C. to about $65 \times 10^{-7}/°$ C.

According to an aspect (14) of the present disclosure, the laminate glass article of aspect (12) is provided, wherein each of the plurality of clad glass layers comprises a first CTE from about $75 \times 10^{-7}/°$ C. to about $103 \times 10^{-7}/°$ C.

According to an aspect (15) of the present disclosure, the laminate glass article of aspect (10) is provided, wherein a total thickness of the plurality of clad glass layers and the core glass layer ranges from about 0.2 mm to about 2 mm.

According to an aspect (16) of the present disclosure, the laminate glass article of any of the aspects of (10)-(15) is provided, wherein each of the plurality of clad glass layers further comprises a plurality of ion-exchangeable ions and an ion-exchanged compressive stress region, and further wherein the ion-exchanged compressive stress region is defined from the first primary surface to a first selected depth in each of the plurality of clad glass layers.

According to an aspect (17) of the present disclosure, the laminate glass article of any of the aspects of (10)-(16) is provided, wherein the laminate glass article comprises an edge ion-exchanged compressive stress region, the edge ion-exchanged compressive stress region defined from an edge of the laminate glass article to a second selected depth in the core and clad glass layers.

According to an aspect (18) of the present disclosure, a laminate glass article is provided. The laminate glass article comprises: a core glass layer comprising a first coefficient of thermal expansion (CTE); and a plurality of clad glass layers, each comprising a first primary surface, a second primary surface in contact with the core glass layer and a second CTE that is lower than the first CTE of the core glass layer, wherein the difference in the first and second CTE is about $10 \times 10^{-7}/°$ C. to about $70 \times 10^{-7}/°$ C., wherein each of the core glass layer and the clad glass layers comprises a viscosity from $10^{9.0}$ to $10^{14.0}$ Poise from about 550° C. to about 700° C., and further wherein a ratio of the thickness of the core glass layer to the thickness of the plurality of clad glass layers is about 1 to about 20.

According to an aspect (19) of the present disclosure, the laminate glass article of aspect (18) is provided, wherein each of the plurality of clad glass layers comprises:
58 to 77% $SiO_2$;
0.5 to 11% $Al_2O_3$;
0 to 18% $B_2O_3$;
2 to 9% $Na_2O$;
0 to 3% $K_2O$;
0 to 5% MgO;
0 to 4% CaO;
0 to 11% ZnO; and
0 to 1% $SnO_2$ (by weight).

According to an aspect (20) of the present disclosure, the laminate glass article of aspect (18) is provided, wherein each of the plurality of clad glass layers comprises:
57 to 72% $SiO_2$;
9 to 17% $Al_2O_3$;
0 to 1.5% $B_2O_3$;
10 to 18% $Na_2O$;
1 to 7% $K_2O$;
0 to 4% MgO;
0 to 1.5% CaO;
0 to 7% SrO;
0 to 4% ZnO;
0.2 to 1% $SnO_2$; and
0 to 4% $P_2O_5$ (by weight).

According to an aspect (21) of the present disclosure, the laminate glass article of aspect (19) is provided, wherein each of the plurality of clad glass layers comprises a second CTE from about $33 \times 10^{-7}/°$ C. to about $65 \times 10^{-7}/°$ C.

According to an aspect (22) of the present disclosure, the laminate glass article of aspect (20) is provided, wherein the core glass layer comprises a first CTE from about $75 \times 10^{-7}/°$ C. to about $103 \times 10^{-7}/°$ C.

According to an aspect (23) of the present disclosure, the laminate glass article of aspect (18) is provided, wherein a ratio of the thickness of the core glass layer to the thickness of the plurality of clad glass layers is about 1 to about 10.

According to an aspect (24) of the present disclosure, the laminate glass article of any of aspects of (18)-(23) is provided, wherein each of the plurality of clad glass layers further comprises a plurality of ion-exchangeable ions and an ion-exchanged compressive stress region, and further wherein the ion-exchanged compressive stress region is defined from the first primary surface to a first selected depth in each of the plurality of clad glass layers.

According to an aspect (25) of the present disclosure, the laminate glass article of any of aspects (18)-(24) is provided, wherein the laminate glass article comprises an edge ion-exchanged compressive stress region, the edge ion-exchanged compressive stress region defined from an edge of the laminate glass article to a second selected depth in the core and clad glass layers.

While exemplary embodiments and examples have been set forth for the purpose of illustration, the foregoing description is not intended in any way to limit the scope of disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

What is claimed is:

1. A laminate glass article, comprising:
a core glass layer comprising a first coefficient of thermal expansion (CTE); and
a plurality of clad glass layers, each clad glass layer comprising a first primary surface, a second primary surface in contact with the core glass layer, and a second CTE that is lower than the first CTE,
wherein a difference between the first CTE and the second CTE is in a range from about $10 \times 10^{-7}/°$ C. to about $70 \times 10^{-7}/°$ C., and
each of the core glass layer and the clad glass layers comprises a viscosity of about $10^{9.9}$ Poise from about 550° C. to about 720° C.,
wherein each clad glass layer of the plurality of clad glass layers comprises 0.5% to 8% $Al_2O_3$ by weight.

2. The laminate glass article according to claim 1, wherein the core glass layer comprises by weight:
57% to 72% $SiO_2$;
9% to 17% $Al_2O_3$;
0% to 1.5% $B_2O_3$;
10% to 18% $Na_2O$;
1% to 7% $K_2O$;
0% to 4% MgO;
0% to 1.5% CaO;
0% to 4% ZnO;
0.2% to 1% $SnO_2$; and
0% to 4% $P_2O_5$.

3. The laminate glass article according to claim 1, wherein each clad glass layer of the plurality of clad glass layers comprises by weight:
61.1% to 74.2% $SiO_2$;

0.8% to 8% $Al_2O_3$;
0% to 16.4% $B_2O_3$;
2.3% to 7.7% $Na_2O$;
0% to 2% $K_2O$;
0% to 3.9% MgO;
0% to 3.1% CaO;
0% to 9.8% ZnO; and
0% to 0.5% $SnO_2$.

4. The laminate glass article according to claim 1, wherein the core glass layer comprises by weight:
60% to 69% $SiO_2$;
10.9% to 15.8% $Al_2O_3$;
0% to 1.1% $B_2O_3$;
11.2% to 15.9% $Na_2O$;
1.6% to 5.7% $K_2O$;
0% to 3.1% MgO;
0% to 0.9% CaO;
0% to 2.5% ZnO;
0.2% to 0.5% $SnO_2$; and
0% to 3.2% $P_2O_5$.

5. The laminate glass article according to claim 1, wherein each clad glass layer of the plurality of clad glass layers further comprises a plurality of ion-exchangeable ions and an ion-exchanged compressive stress region, and the ion-exchanged compressive stress region is defined from the first primary surface to a first selected depth in each of the plurality of clad glass layers.

6. The laminate glass article according to claim 1, wherein the laminate glass article comprises an edge ion-exchanged compressive stress region, the edge ion-exchanged compressive stress region defined from an edge of the laminate glass article to a second selected depth in the core and clad glass layers.

7. The laminate glass article according to claim 1, wherein the laminate glass article is bonded to a soda-lime glass (SLG) ply, and wherein each of the core glass layer and the clad glass layers comprises a viscosity within +25% of a viscosity of the SLG ply over a range of from about 550° C. to about 720° C.

8. The laminate glass article according to claim 1, wherein each clad glass layer of the plurality of clad glass layers comprises by weight:
58% to 77% $SiO_2$;
0% to 18% $B_2O_3$;
2% to 9% $Na_2O$;
0% to 3% $K_2O$;
0% to 5% MgO;
0% to 4% CaO;
0% to 11% ZnO; and
0% to 1% $SnO_2$.

9. The laminate glass article according to claim 8, wherein each second CTE is in a range from about $33\times10^{-7}$/° C. to about $65\times10^{-7}$/° C.

10. A laminate glass article, comprising:
a core glass layer comprising a first coefficient of thermal expansion (CTE); and
a plurality of clad glass layers, each clad glass layer comprising a first primary surface, a second primary surface in contact with the core glass layer, and a second CTE that is lower than the first CTE,
wherein a difference between the first CTE and the second CTE is in a range from about $10\times10^{-7}$/° C. to about $70\times10^{7}$/° C.,
wherein each of the core glass layer and the clad glass layers comprises a viscosity of about $10^{9.9}$ Poise from about 550° C. to about 720° C., and
a total thickness of the plurality of clad glass layers and the core glass layer ranges from about 0.15 mm to about 3 mm,
wherein each clad glass layer of the plurality of clad glass layers comprises 0.5% to 8% $Al_2O_3$ by weight.

11. The laminate glass article according to claim 10, wherein the core glass layer comprises by weight:
57% to 72% $SiO_2$;
9% to 17% $Al_2O_3$;
0% to 1.5% $B_2O_3$;
10% to 18% $Na_2O$;
1% to 7% $K_2O$;
0% to 4% MgO;
0% to 1.5% CaO;
0% to 4% ZnO;
0.2% to 1% $SnO_2$; and
0% to 4% $P_2O_5$.

12. The laminate glass article according to claim 10, wherein a total thickness of the plurality of clad glass layers and the core glass layer ranges from about 0.2 mm to about 2 mm.

13. The laminate glass article according to claim 10, wherein each of the plurality of clad glass layers further comprises a plurality of ion-exchangeable ions and an ion-exchanged compressive stress region, and the ion-exchanged compressive stress region is defined from the first primary surface to a first selected depth in each of the plurality of clad glass layers.

14. The laminate glass article according to claim 10, wherein the laminate glass article comprises an edge ion-exchanged compressive stress region, the edge ion-exchanged compressive stress region defined from an edge of the laminate glass article to a second selected depth in the core and clad glass layers.

15. The laminate glass article according to claim 10, wherein the laminate glass article is bonded to a soda-lime glass (SLG) ply, and wherein each of the core glass layer and the clad glass layers comprises a viscosity within ±25% of a viscosity of the SLG ply over a range of from about 550° C. to about 720° C.

16. The laminate glass article according to claim 10, wherein each clad glass layer of the plurality of clad glass layers comprises by weight:
58% to 77% $SiO_2$;
0% to 18% $B_2O_3$;
2% to 9% $Na_2O$;
0% to 3% $K_2O$;
0% to 5% MgO;
0% to 4% CaO;
0% to 11% ZnO; and
0% to 1% $SnO_2$.

17. The laminate glass article according to claim 16, wherein each second CTE is in a range from about $33\times10^{-7}$/° C. to about $65\times10^{-7}$/° C.

18. A laminate glass article, comprising:
a core glass layer comprising a first coefficient of thermal expansion (CTE); and
a plurality of clad glass layers, each clad glass layer comprising a first primary surface, a second primary surface in contact with the core glass layer, and a second CTE that is lower than the first CTE,
wherein a difference between the first CTE and the second CTE is in a range from about $10\times10^{-7}$/° C. to about $70\times10^{-7}$/° C.,
wherein each of the core glass layer and the clad glass layers comprises a viscosity of about $10^{9.9}$ Poise from about 550° C. to about 720° C., and a ratio of a thickness of the core glass layer to a thickness of the plurality of clad glass layers is in a range from about 1 to about 20, wherein each clad glass layer of the plurality of clad glass layers comprises 0.5% to 8% $Al_2O_3$ by weight.

19. The laminate glass article according to claim 18, wherein the core glass layer comprises by weight:

57% to 72% $SiO_2$;
9% to 17% $Al_2O_3$;
0% to 1.5% $B_2O_3$;
10% to 18% $Na_2O$;
1% to 7% $K_2O$;
0% to 4% MgO;
0% to 1.5% CaO;
0% to 4% ZnO;
0.2% to 1% $SnO_2$; and
0% to 4% $P_2O_5$.

20. The laminate glass article according to claim 18, wherein a ratio of a thickness of the core glass layer to a thickness of the plurality of clad glass layers is in a range from about 1 to about 10.

21. The laminate glass article according to claim 18, wherein each of the plurality of clad glass layers further comprises a plurality of ion-exchangeable ions and an ion-exchanged compressive stress region, and the ion-exchanged compressive stress region is defined from the first primary surface to a first selected depth in each of the plurality of clad glass layers.

22. The laminate glass article according to claim 18, wherein the laminate glass article comprises an edge ion-exchanged compressive stress region, the edge ion-exchanged compressive stress region defined from an edge of the laminate glass article to a second selected depth in the core and clad glass layers.

23. The laminate glass article according to claim 18, wherein the laminate glass article is bonded to a soda-lime glass (SLG) ply, and wherein each of the core glass layer and the clad glass layers comprises a viscosity within ±25% of a viscosity of the SLG ply over a range of from about 550° C. to about 720° C.

24. The laminate glass article according to claim 18, wherein each clad glass layer of the plurality of clad glass layers comprises by weight:

58% to 77% $SiO_2$;
0% to 18% $B_2O_3$;
2% to 9% $Na_2O$;
0% to 3% $K_2O$;
0% to 5% MgO;
0% to 4% CaO;
0% to 11% ZnO; and
0% to 1% $SnO_2$.

25. The laminate glass article according to claim 24, wherein each second CTE is in a range from about $33 \times 10^{-7}/°$ C. to about $65 \times 10^{-7}/°$ C.

* * * * *